US010616012B2

(12) United States Patent
Hyakudai et al.

(10) Patent No.: US 10,616,012 B2
(45) Date of Patent: Apr. 7, 2020

(54) TRANSMITTING DEVICE, RECEIVING DEVICE, AND COMMUNICATION SYSTEM

(71) Applicant: Sony Corporation, Tokyo (JP)

(72) Inventors: Toshihisa Hyakudai, Kanagawa (JP); Takashi Yokokawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 212 days.

(21) Appl. No.: 15/554,526

(22) PCT Filed: Mar. 3, 2016

(86) PCT No.: PCT/JP2016/056575
§ 371 (c)(1),
(2) Date: Aug. 30, 2017

(87) PCT Pub. No.: WO2016/158188
PCT Pub. Date: Oct. 6, 2016

(65) Prior Publication Data
US 2018/0076986 A1 Mar. 15, 2018

(30) Foreign Application Priority Data

Mar. 30, 2015 (JP) .................................. 2015-069107

(51) Int. Cl.
*H04L 1/00* (2006.01)
*H04L 25/03* (2006.01)
(Continued)

(52) U.S. Cl.
CPC ...... *H04L 25/03866* (2013.01); *H04L 1/0041* (2013.01); *H04L 1/0045* (2013.01);
(Continued)

(58) Field of Classification Search
CPC ............. H04L 25/03866; H04L 1/0041; H04L 1/0045; H04L 1/0061; H04L 7/04; H04L 7/041; H04L 29/22
(Continued)

(56) References Cited

U.S. PATENT DOCUMENTS

2007/0121946 A1* 5/2007 Ito .......................... H04L 1/0057
380/270
2008/0031450 A1* 2/2008 Yamashita ........... H04N 7/1675
380/212

(Continued)

FOREIGN PATENT DOCUMENTS

JP 2013-239940 A 11/2013
JP 2014-509796 A 4/2014
(Continued)

*Primary Examiner* — Christine T. Tu
(74) *Attorney, Agent, or Firm* — Michael Best & Friedrich LLP

(57) ABSTRACT

A transmitting device of the disclosure includes a plurality of transmitters each of which includes a scrambler that performs a scrambling process on transmission data by using random data generated on the basis of an initial value and that transmits the transmission data on which the scrambling process has been performed. An initial value of a first scrambler in a first transmitter is different from an initial value of a second scrambler in a second transmitter, and the first transmitter and the second transmitter belongs to the plurality of transmitters.

20 Claims, 15 Drawing Sheets

(51) Int. Cl.
 *H04L 7/04* (2006.01)
 *H04L 29/06* (2006.01)
(52) U.S. Cl.
 CPC .............. *H04L 1/0061* (2013.01); *H04L 7/04* (2013.01); *H04L 7/041* (2013.01); *H04L 69/22* (2013.01)
(58) Field of Classification Search
 USPC .......................... 714/776, 746, 752, 757, 758
 See application file for complete search history.

(56) References Cited

U.S. PATENT DOCUMENTS

2014/0132575 A1* 5/2014 Yang ........................ G09G 3/20
 345/204
2015/0312037 A1* 10/2015 Newman ............... H04L 9/0869
 380/268

FOREIGN PATENT DOCUMENTS

| | | |
|---|---|---|
| JP | 2014-160966 A | 9/2014 |
| WO | 02/084936 A1 | 10/2002 |
| WO | 2007/126821 A2 | 11/2007 |

* cited by examiner

[FIG. 1]
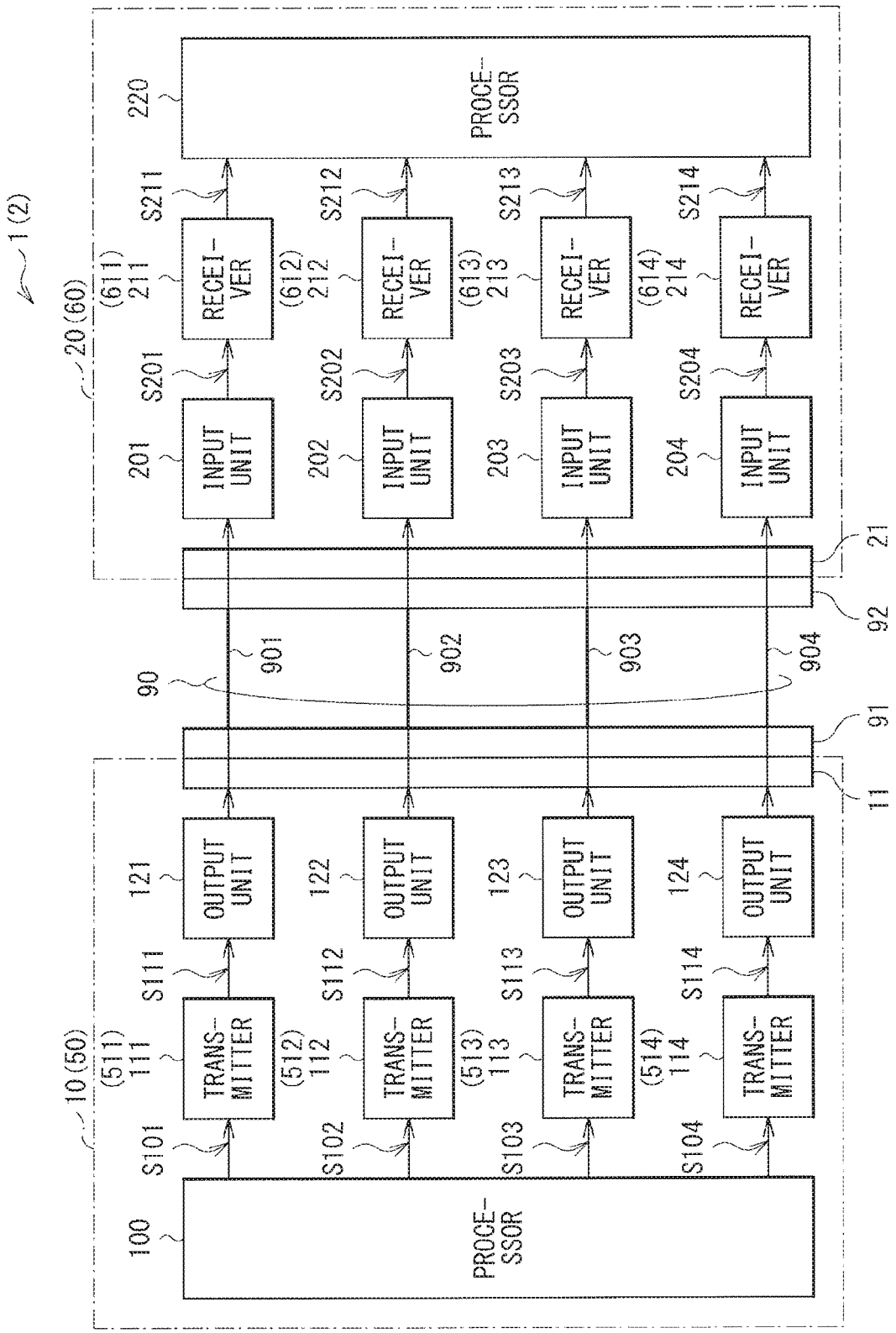

[ FIG. 2 ]
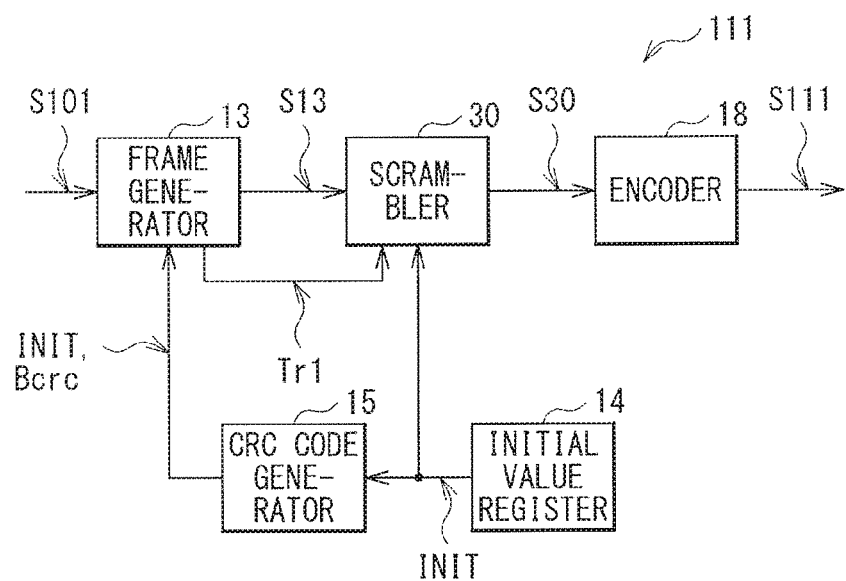
[ FIG. 3 ]
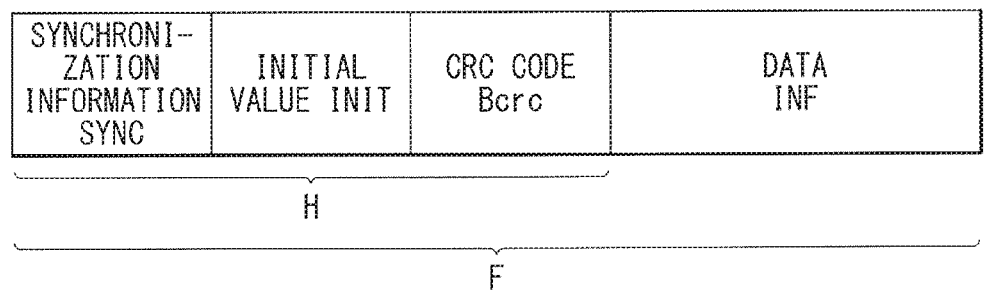

[ FIG. 4 ]
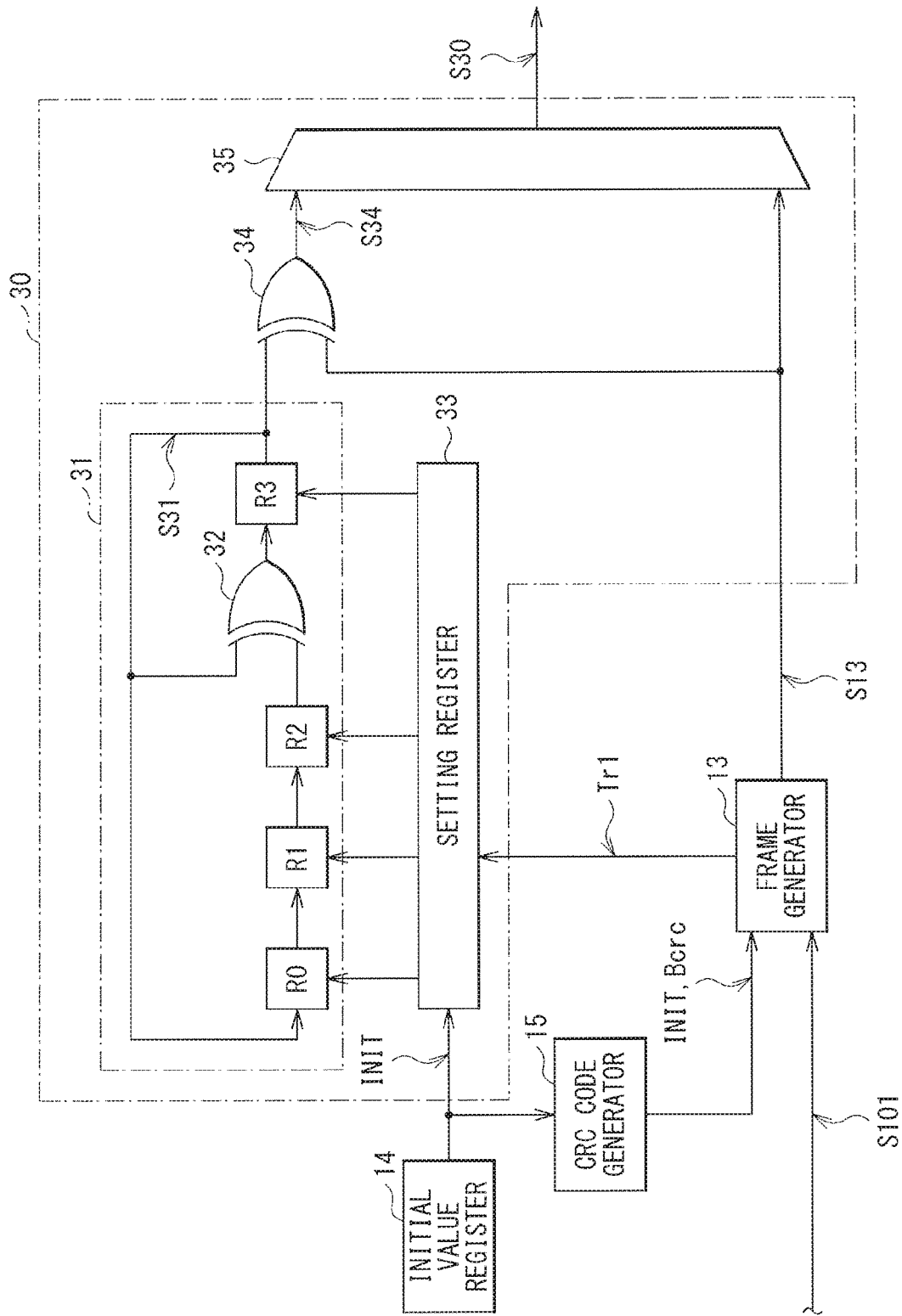

[ FIG. 5 ]
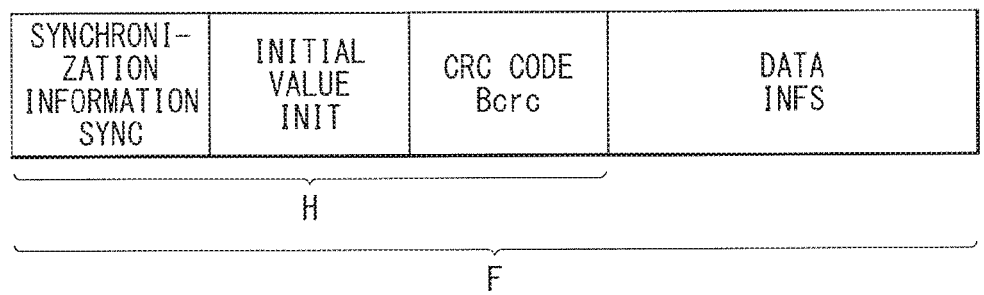
[ FIG. 6 ]
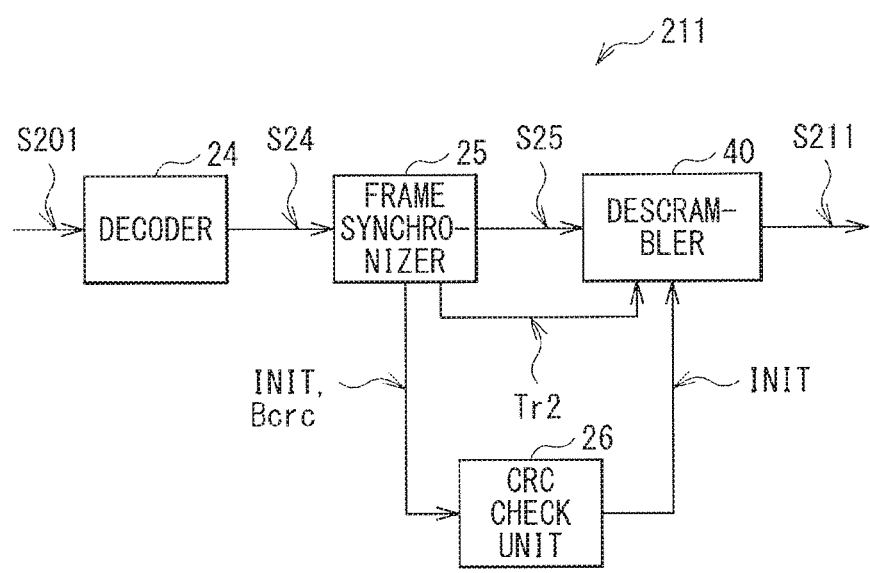

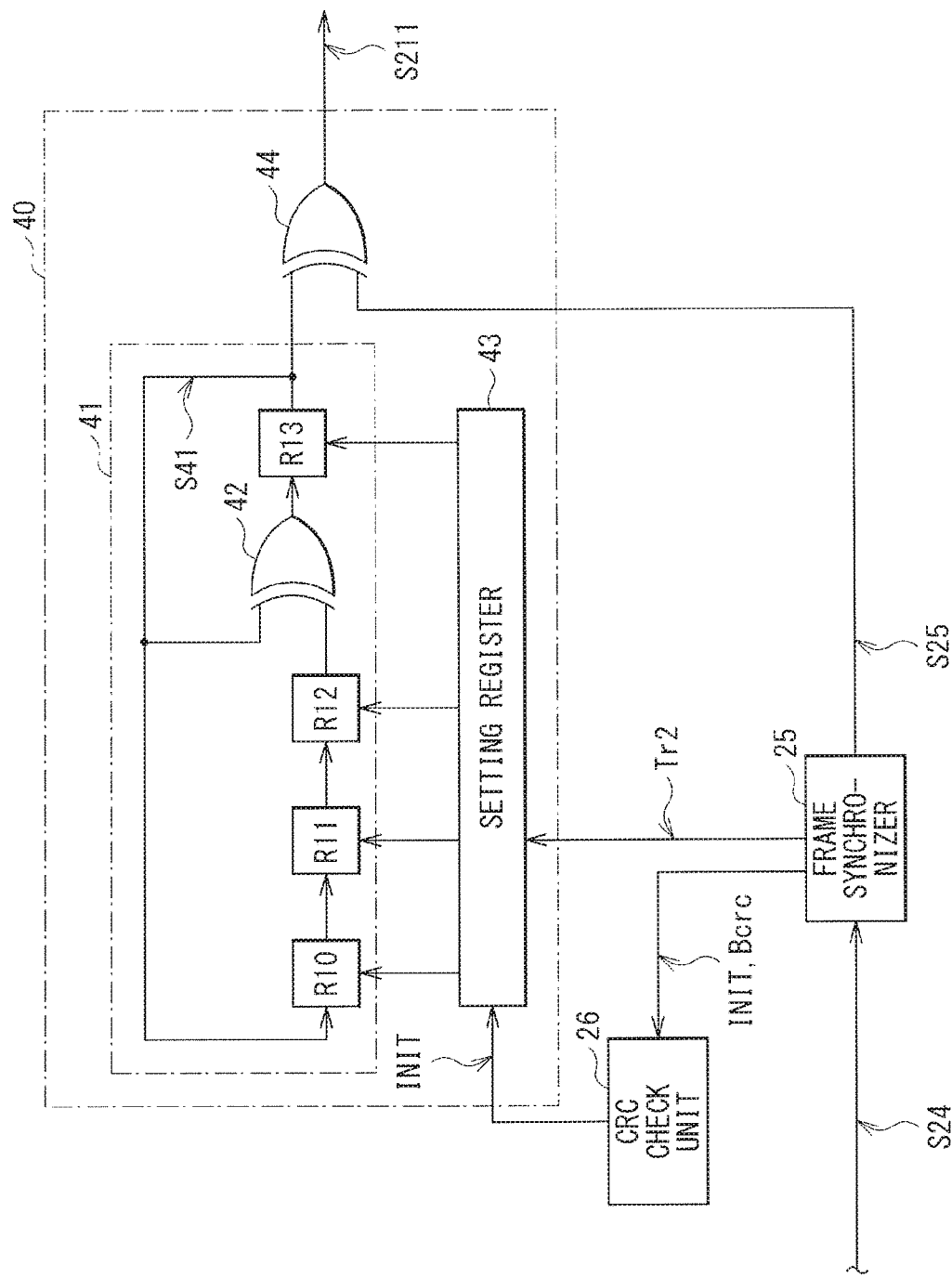
[FIG. 7]

[ FIG. 8 ]
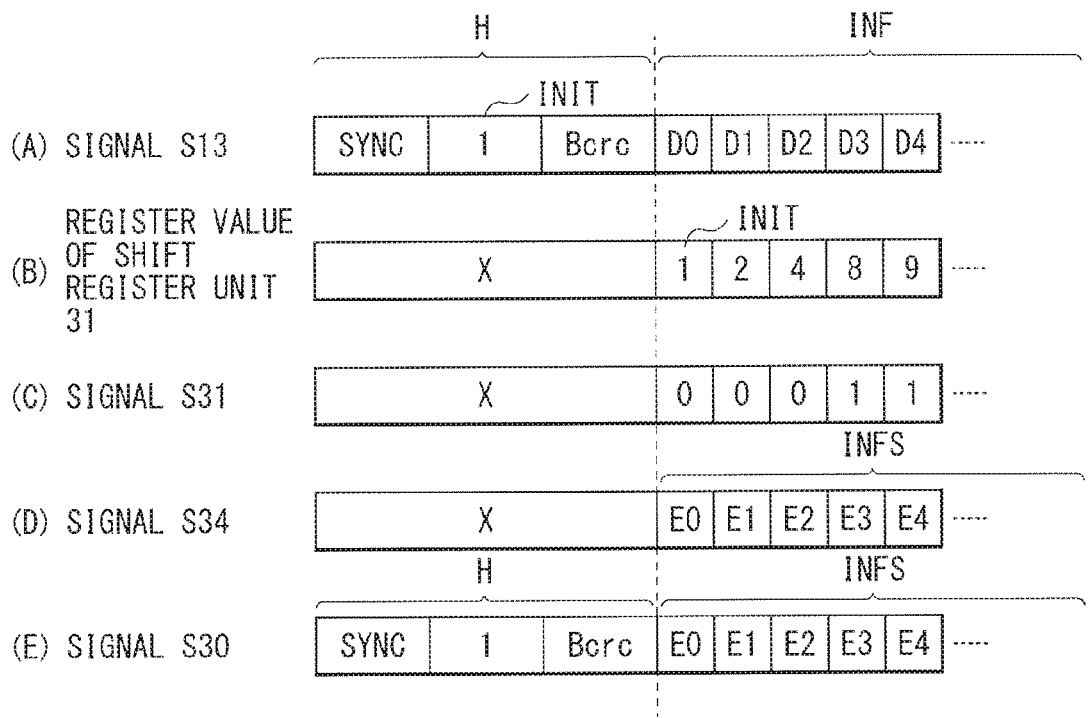
[ FIG. 9 ]
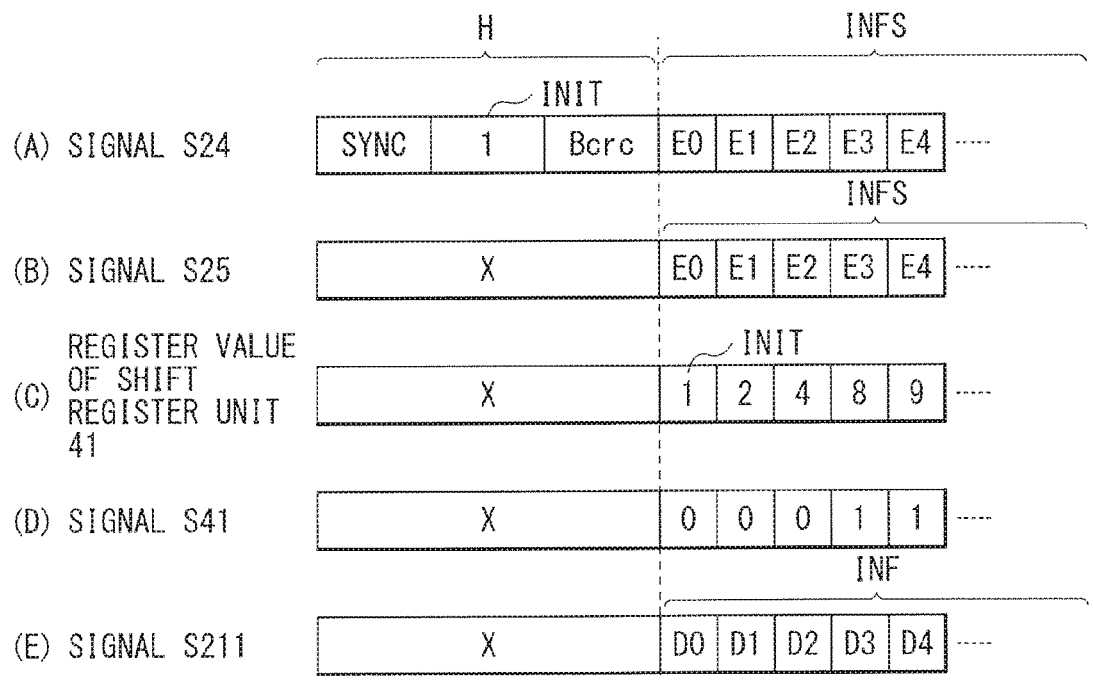

[ FIG. 10 ]
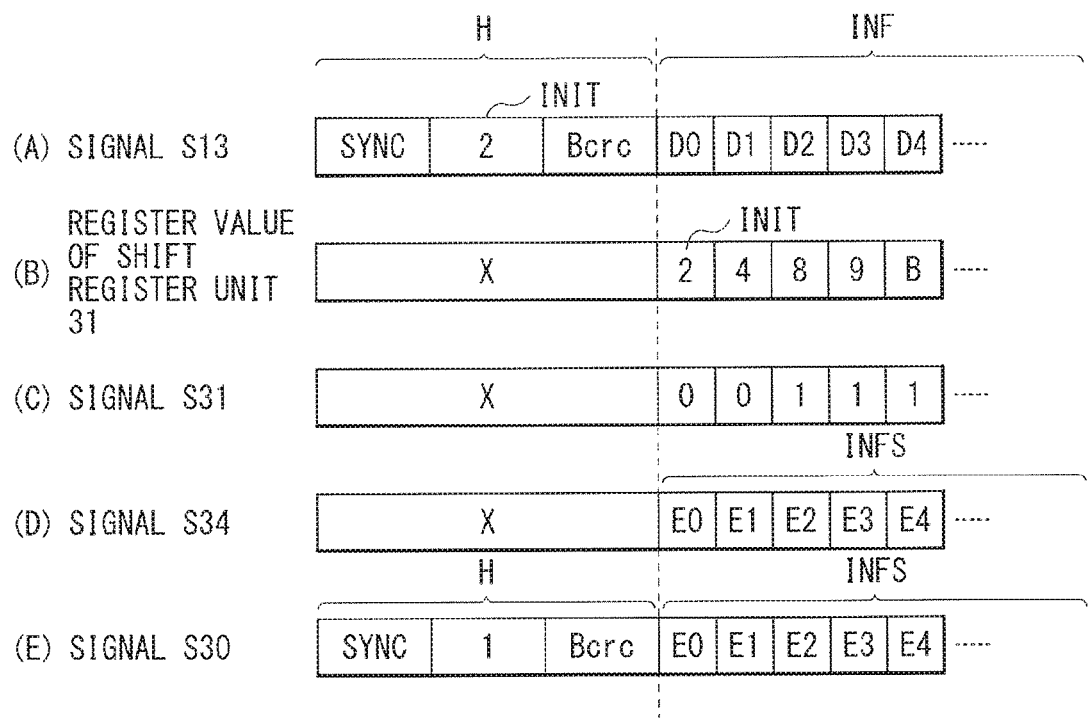

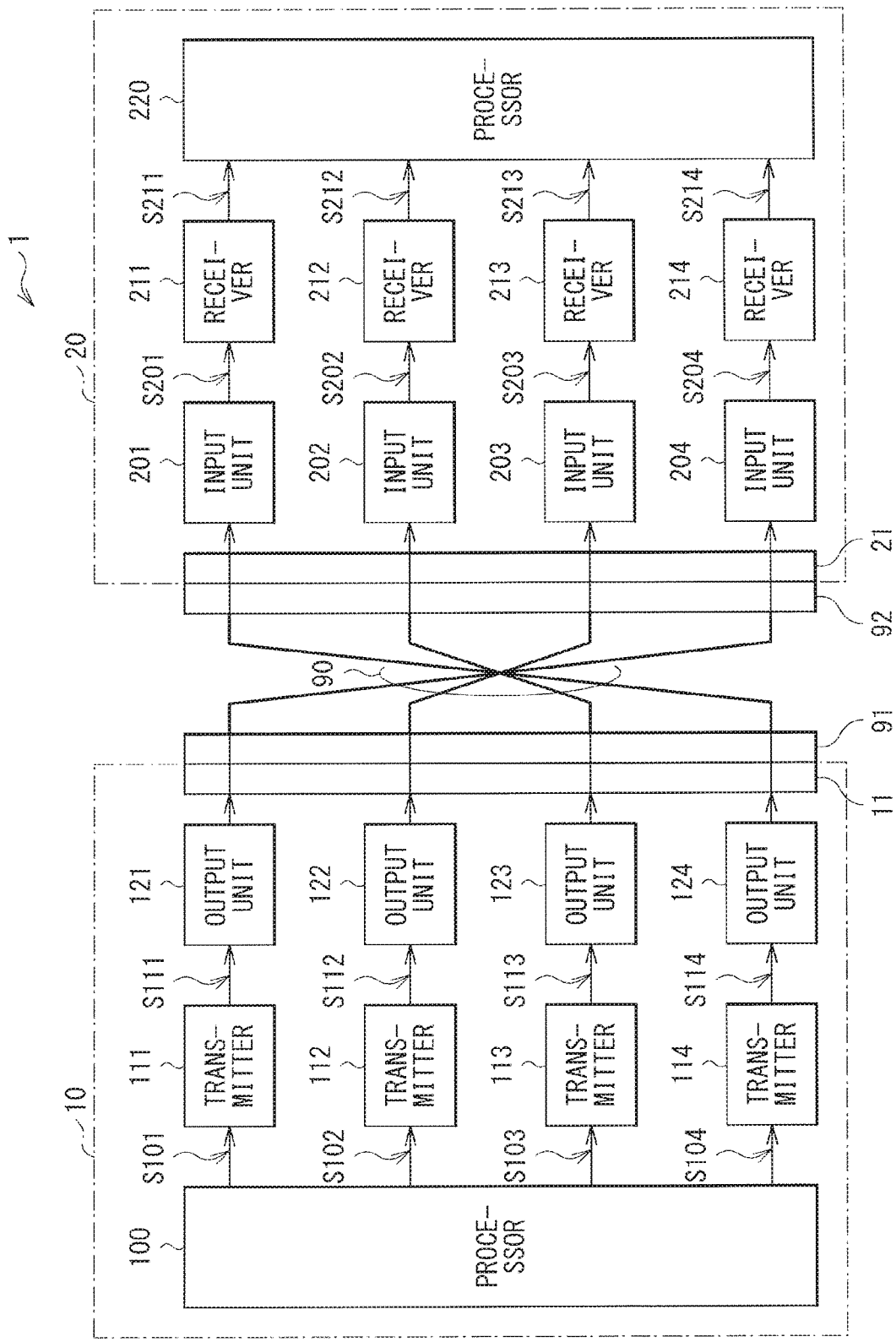
[FIG. 11]

[ FIG. 12 ]
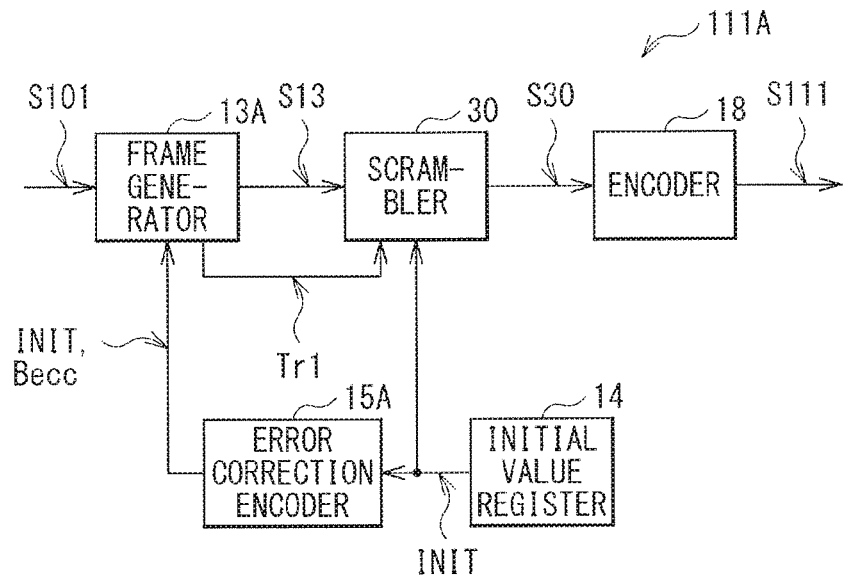
[ FIG. 13 ]
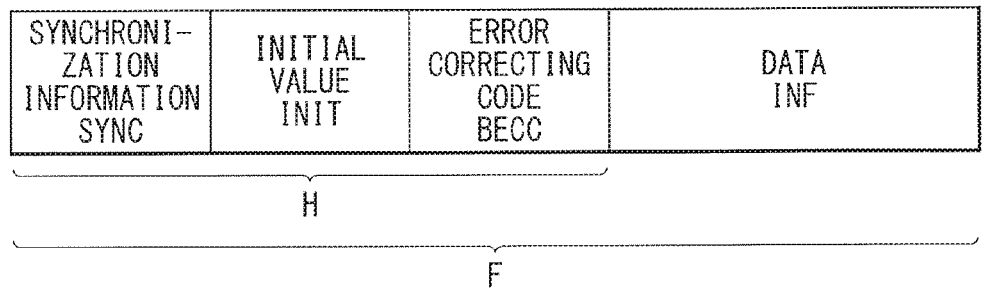
[ FIG. 14 ]
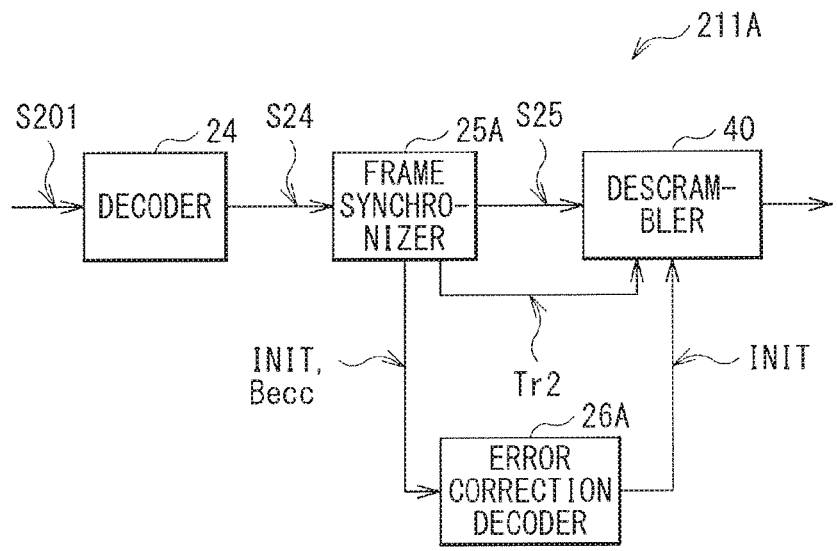

[ FIG. 15 ]
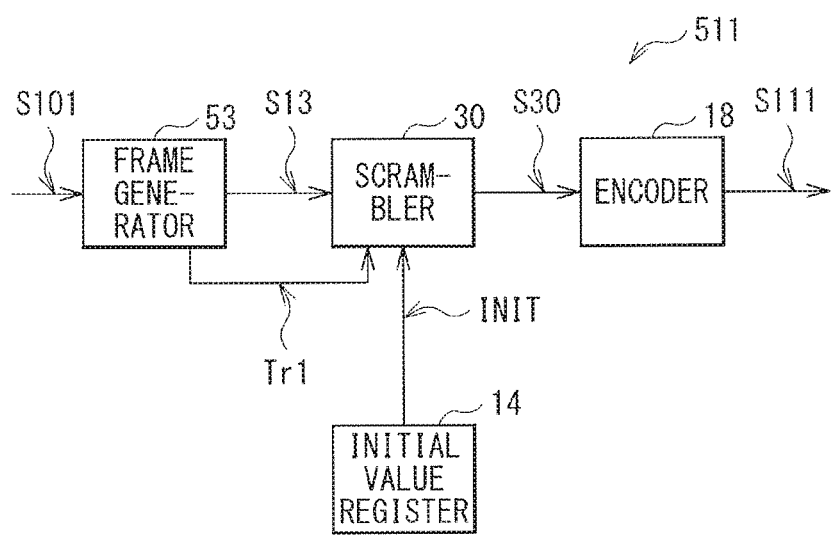
[ FIG. 16 ]
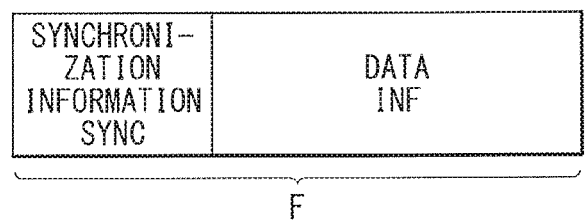

[FIG. 17]
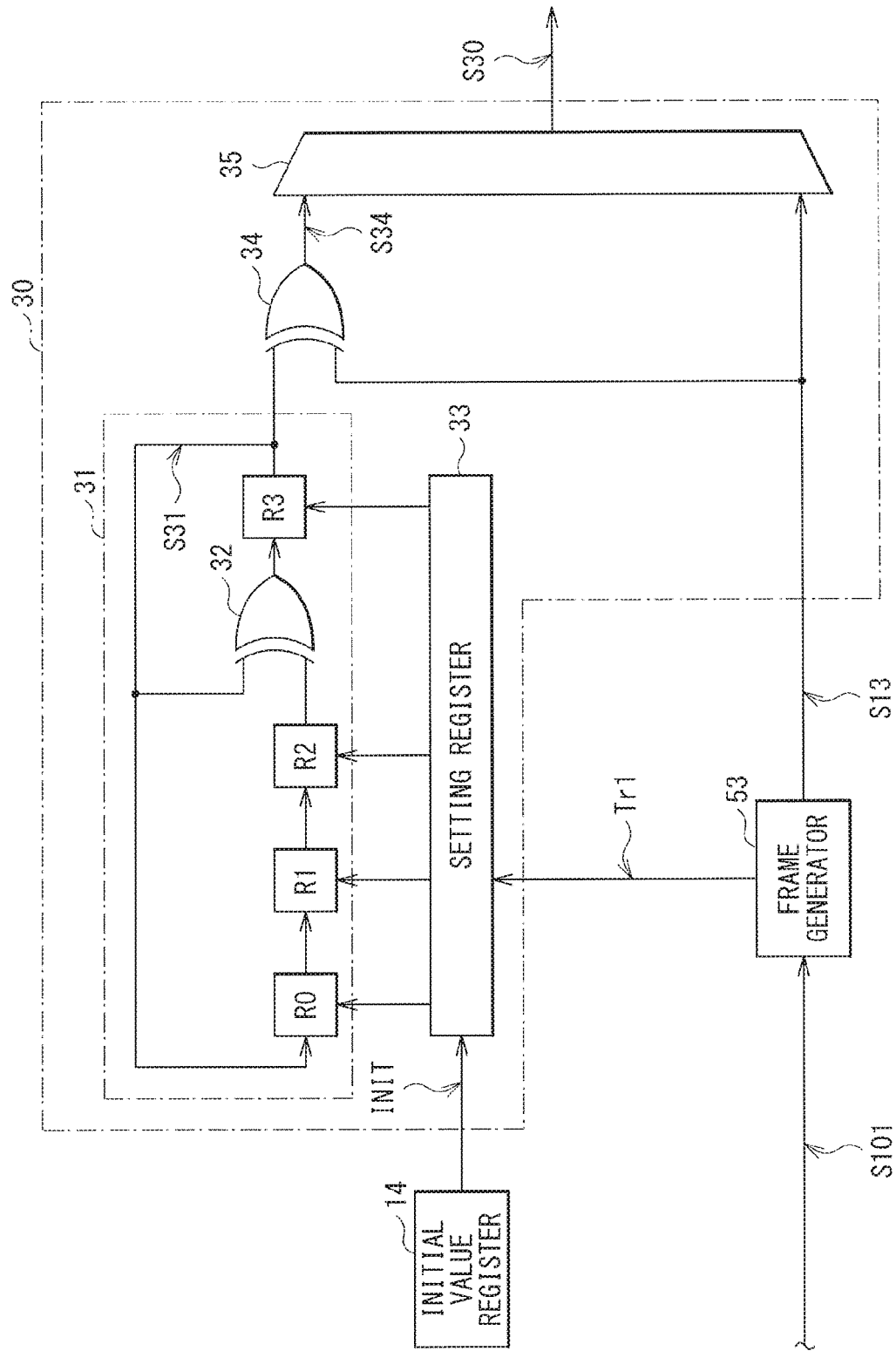

[ FIG. 18 ]
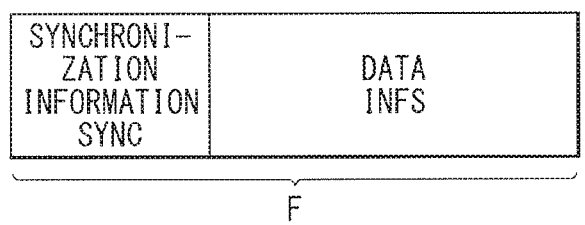
[ FIG. 19 ]
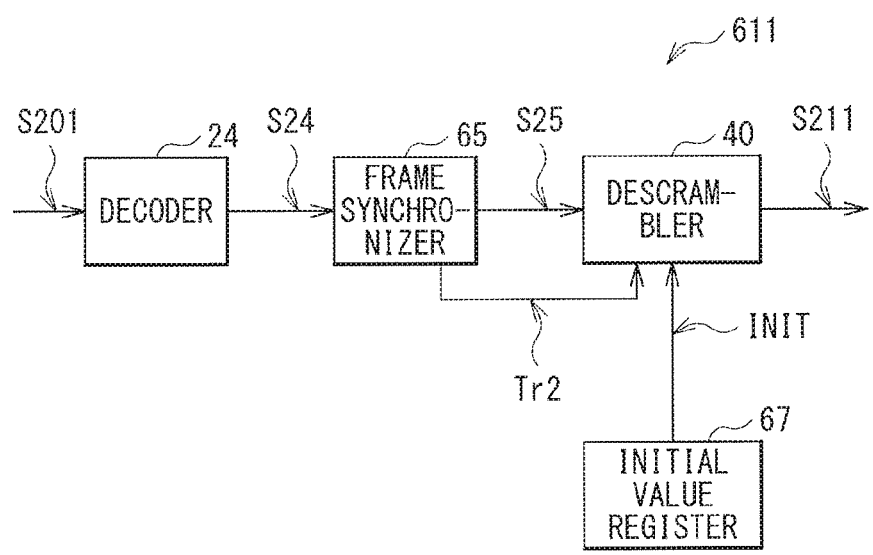

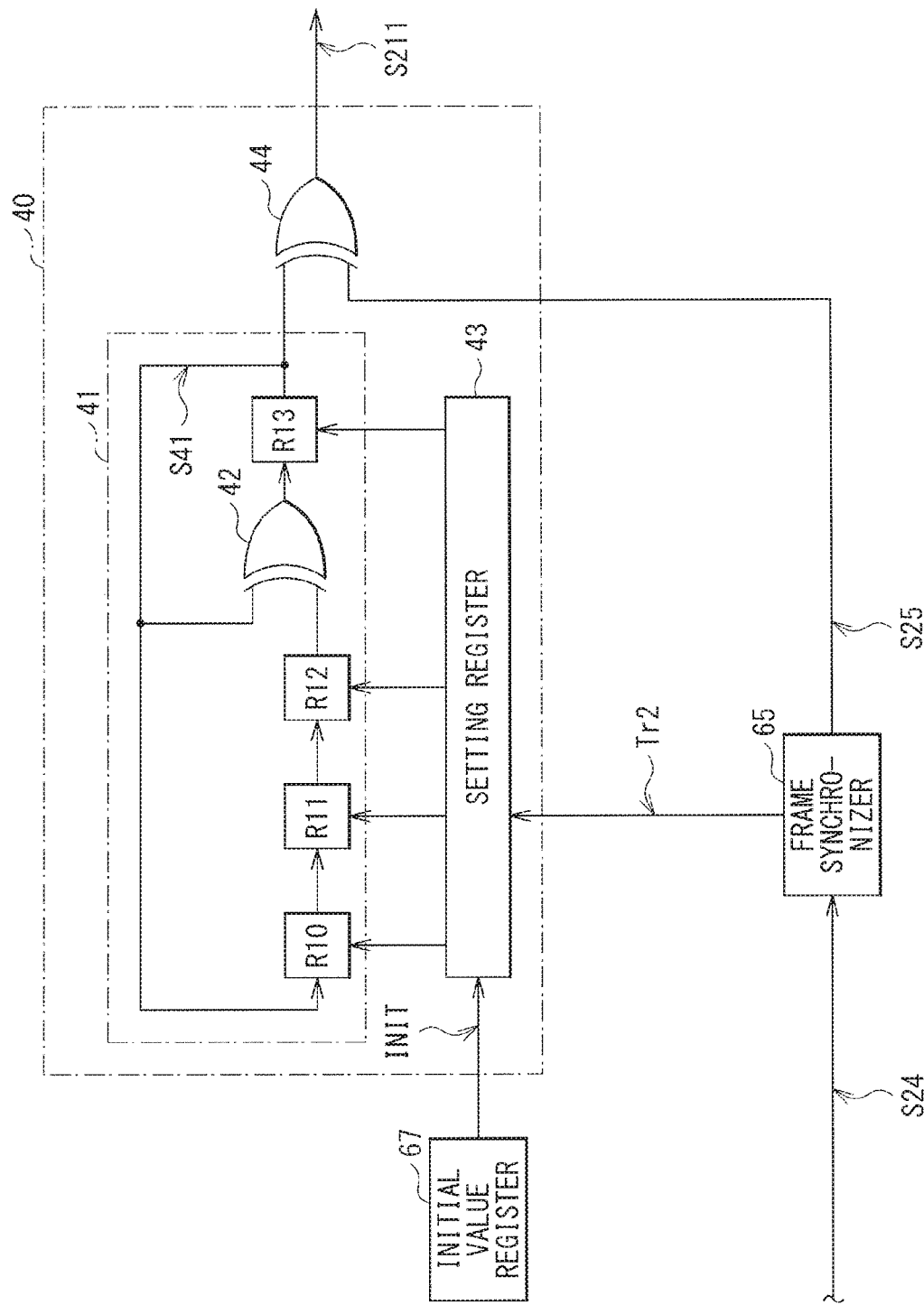
[FIG. 20]

[ FIG. 21 ]
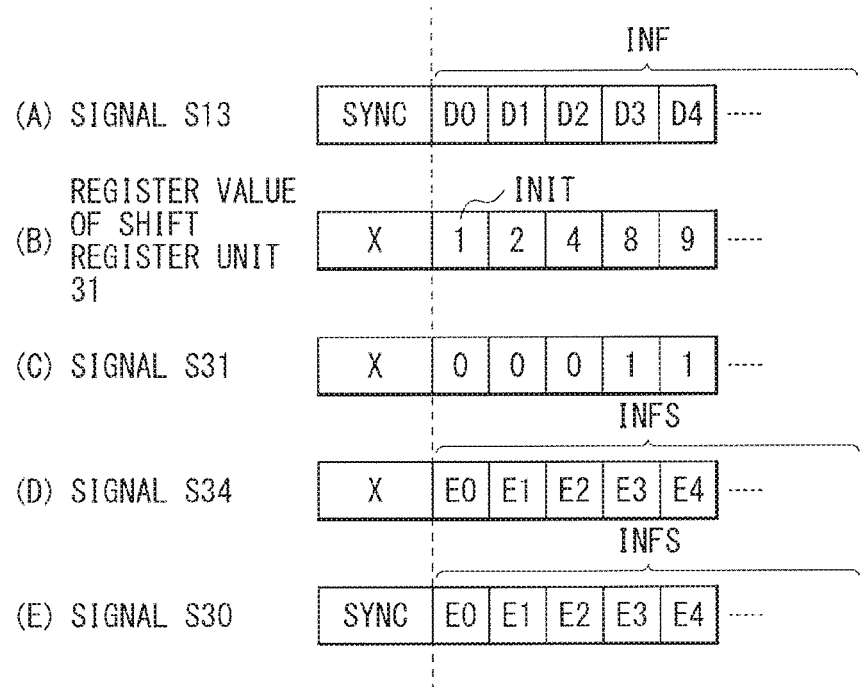
[ FIG. 22 ]
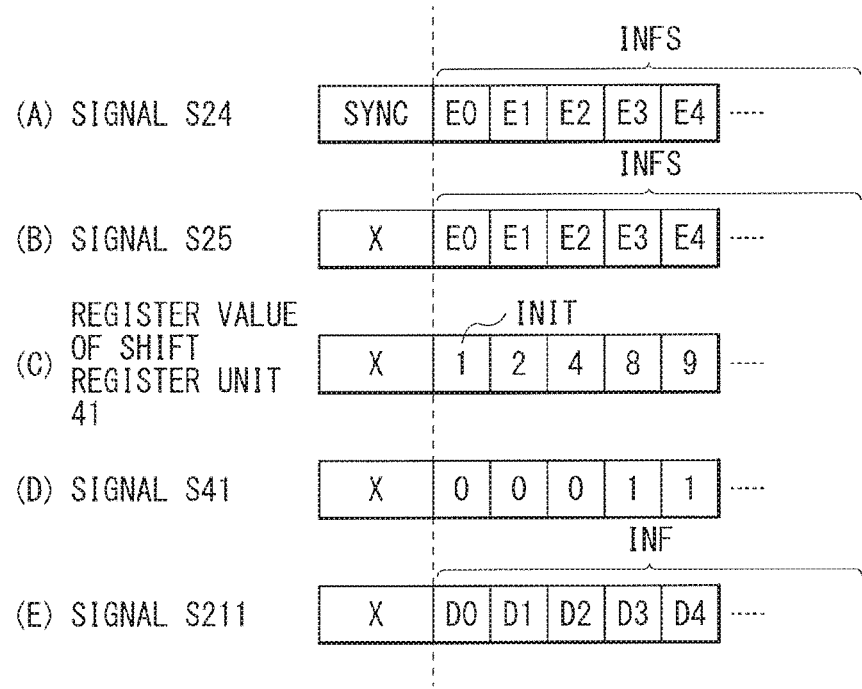

[ FIG. 23 ]
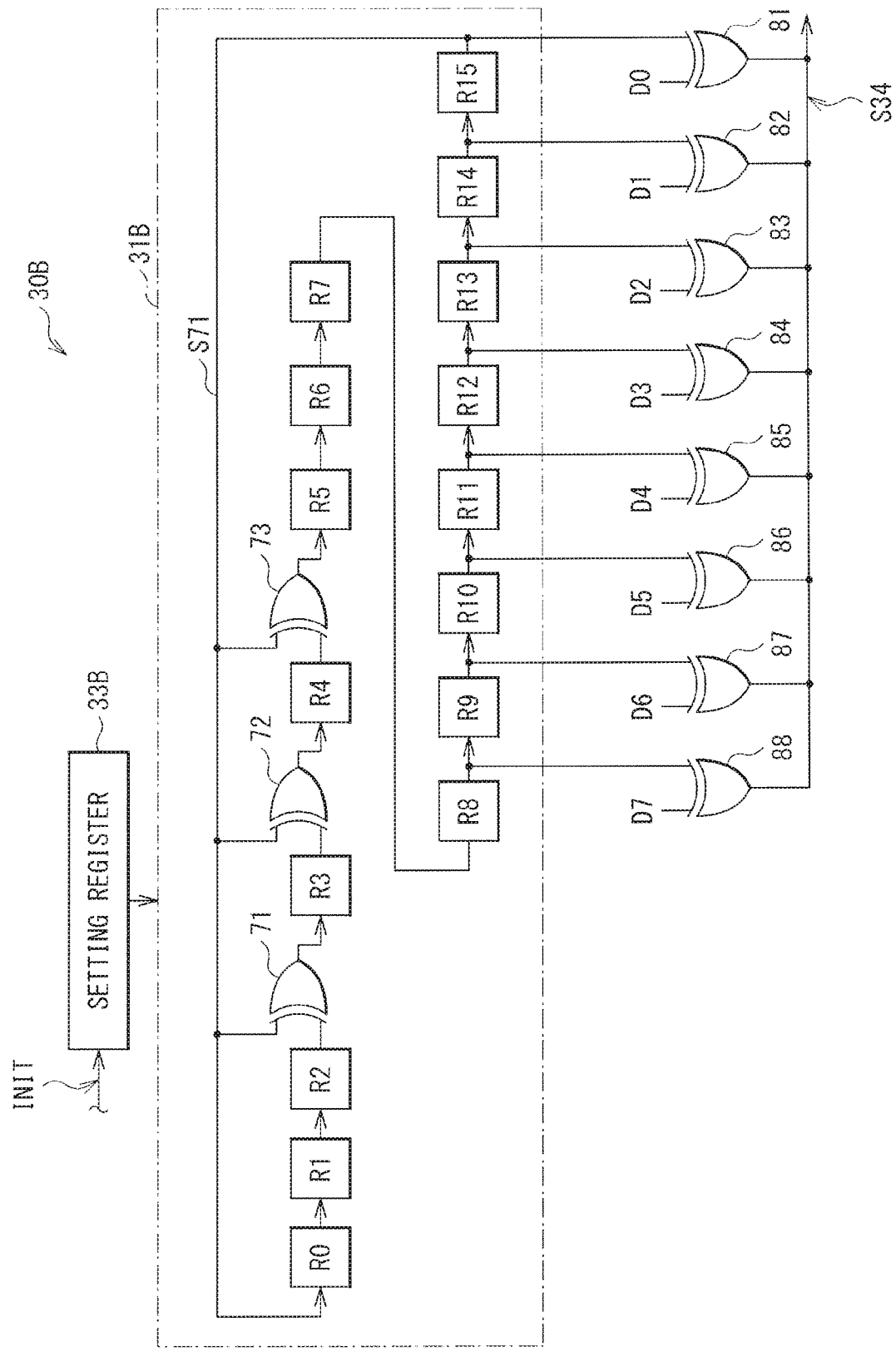

TRANSMITTING DEVICE, RECEIVING DEVICE, AND COMMUNICATION SYSTEM

TECHNICAL FIELD

The disclosure relates to: a transmitting device that transmits a signal; a receiving device that receives a signal; and a communication system that includes such a transmitting device and a receiving device.

BACKGROUND ART

Electronic apparatuses tend to interchange increasing amounts of information with the recent advancement of their functionality and versatility. In some cases, for example, an electronic apparatus is coupled to another electronic apparatus by wire communication. Some of such communication systems in which wired communication is conducted perform a scrambling process on transmission data (for example, as described in PTL 1 and PTL 2).

CITATION LIST

Patent Literature

[PTL 1] Japanese Unexamined Patent Application Publication No. 2013-239940
[PTL 2] Japanese Unexamined Patent Application Publication No. 2014-160966

SUMMARY OF INVENTION

Incidentally, communication systems emit high-frequency electro-magnetic wave noises, which may cause electro-magnetic interference (EMI). Thus, there are expectations that the risk of causing such electro-magnetic interference is reduced.

It is therefore desirable to provide a transmitting device, a receiving device, and a communication system that make it possible to reduce the risk of causing electro-magnetic interference.

A transmitting device according to an embodiment of the disclosure includes a plurality of transmitters. Each of the plurality of transmitters includes a scrambler that performs a scrambling process on transmission data by using random data generated on a basis of an initial value and that transmits the transmission data on which the scrambling process has been performed. An initial value of a first scrambler in a first transmitter is different from an initial value of a second scrambler in a second transmitter, and the first transmitter and the second transmitter belong to the plurality of transmitters.

A receiving device according to an embodiment of the disclosure includes a plurality of receivers. Each of the plurality of receivers has a descrambler that performs a descrambling process on reception data by using random data generated on a basis of a first initial value. A first initial value of a first descrambler in a first receiver is different from a first initial value of a second descrambler in a second receiver, and the first receiver and the second receiver belong to the plurality of receivers.

A communication system according to an embodiment of the disclosure includes a transmitting device and a receiving device. The transmitting device includes a plurality of transmitters. Each of the plurality of transmitters includes a scrambler that performs a scrambling process on transmission data by using random data generated on a basis of an initial value and that transmits the transmission data on which the scrambling process has been performed. The receiving device includes a plurality of receivers corresponding to the plurality of transmitters. An initial value of a first scrambler in a first transmitter is different from an initial value of a second scrambler in a second transmitter, and the first transmitter and the second transmitter belong to the plurality of transmitters.

According to the transmitting device and the communication system in the above-described embodiments of the disclosure, each of the plurality of transmitters generates the random data on the basis of the initial value. Then, each of the plurality of transmitters performs the scrambling process on the transmission data by using this random data, and transmits the transmission data on which the scrambling process has been performed. The initial value of the first scrambler in the first transmitter is different from the initial value of the second scrambler in the second transmitter, and the first transmitter and the second transmitter belong to the plurality of transmitters.

According to the receiving device in the above-described embodiment of the disclosure, each of the plurality of receivers generates the random data on the basis of the first initial value. Then, each of the plurality of receivers performs the descrambling process on the reception data by using this random data. The first initial value of the first descrambler in the first receiver is different from the first initial value of the second scrambler in the second receiver, and the first receiver and the second receiver belong to the plurality of receivers.

According to the transmitting device and the communication system in the above-described embodiments of the disclosure, the initial values of the first and second scramblers are set differently from one another, thereby reducing the risk of causing electro-magnetic interference.

According to the receiving device in the above-described embodiment of the disclosure, the first initial values of the first and second descramblers are set differently from one another, thereby reducing the risk of causing electro-magnetic interference.

It is to be noted that effects of the present technology are not necessarily limited to the effects described here, and may include any of effects described in the present specification.

BRIEF DESCRIPTION OF DRAWINGS

FIG. 1 is a block diagram illustrating a configuration example of a communication system according to an embodiment of the disclosure.

FIG. 2 is a block diagram illustrating a configuration example of a transmitter according to a first embodiment.

FIG. 3 is an explanatory diagram illustrating a configuration example of a frame of a signal to be input to a scrambler illustrated in FIG. 2.

FIG. 4 is a block diagram illustrating a configuration example of the scrambler illustrated in FIG. 2.

FIG. 5 is an explanatory diagram illustrating a configuration example of a frame of a signal to be output from the scrambler illustrated in FIG. 2.

FIG. 6 is a block diagram illustrating a configuration example of a receiver according to the first embodiment.

FIG. 7 is a block diagram illustrating a configuration example of a descrambler illustrated in FIG. 6.

FIG. 8 is a timing diagram illustrating an operation example of a scrambler in a transmitter.

FIG. 9 is a timing diagram illustrating an operation example of a descrambler in a receiver.

FIG. 10 is a timing diagram illustrating an operation example of a scrambler in another transmitter.

FIG. 11 is a block diagram illustrating another connecting state of the communication system illustrated in FIG. 1.

FIG. 12 is a block diagram illustrating a configuration example of a transmitter according to a modification of the first embodiment.

FIG. 13 is an explanatory diagram illustrating a configuration example of a frame of a signal to be input to a scrambler illustrated in FIG. 12.

FIG. 14 is a block diagram illustrating a configuration example of a receiver according to a modification of the first embodiment.

FIG. 15 is a block diagram illustrating a configuration example of a transmitter according to a second embodiment.

FIG. 16 is an explanatory diagram illustrating a configuration example of a frame of a signal to be input to a scrambler illustrated in FIG. 15.

FIG. 17 is a block diagram illustrating a configuration example of the scrambler illustrated in FIG. 15.

FIG. 18 is an explanatory diagram illustrating a configuration example of a frame of a signal to be output from the scrambler illustrated in FIG. 15.

FIG. 19 is a block diagram illustrating a configuration example of a receiver according to a second embodiment.

FIG. 20 is a block diagram illustrating a configuration example of a descrambler illustrated in FIG. 19.

FIG. 21 is a timing diagram illustrating an operation example of a scrambler in a transmitter.

FIG. 22 is a timing diagram illustrating an operation example of a descrambler in a receiver.

FIG. 23 illustrates a configuration example of a scrambler according to a modification.

MODES FOR CARRYING OUT THE INVENTION

Some embodiments of the disclosure will be described below in detail with reference to the accompanying drawings. The description is given in the following order.
1. First embodiment
2. Second embodiment 1. First Embodiment Configuration Example FIG. 1 illustrates a configuration example of a communication system (a communication system 1) according to a first embodiment. This communication system 1 conducts communication by using a plurality of (four in this example) communication lanes.

The communication system 1 includes a transmission cable 90, a transmitting device 10, and a receiving device 20. The transmitting device 10 and the receiving device 20 are coupled to each other via the transmission cable 90. The transmitting device 10 transmits data signals to the receiving device 20 via the transmission cable 90, and the receiving device 20 receives the data signals transmitted from the transmitting device 10 via the transmission cable 90.

The transmission cable 90 includes cables 901 to 904 and connectors 91 and 92. The cables 901 to 904 enable data signals to be transmitted from the transmitting device 10 to the receiving device 20. In a case where the data signals are interchanged through electric signals in the communication system 1, the cables 901 to 904 may be implemented using electric wires through which the electric signals are to be transmitted. Alternatively, in a case where the data signals are interchanged through optical signals in the communication system 1, the cables 901 to 904 may be implemented using optical fibers through which the optical signals are to be transmitted. The connector 91 is provided at one ends of the cables 901 to 904 and coupled to a connector 11 of the transmitting device 10. The connector 92 is provided at the other ends of the cables 901 to 904 and coupled to a connector 21 of the receiving device 20.

The transmitting device 10 includes the connector 11, a processor 100, four transmitters 111 to 114, and four output units 121 to 124.

The connector 11 is coupled to the connector 91 of the transmission cable 90. The processor 100 performs a predetermined process to generate data INF and then outputs the data INF as signals S101 to S104.

The transmitter 111 performs a scrambling process and an encoding process on the basis of the signal S101 to generate a signal S111. Likewise, the transmitter 112 performs a scrambling process and an encoding process on the basis of the signal S102 to generate a signal S112. The transmitter 113 performs a scrambling process and an encoding process on the basis of the signal S103 to generate a signal S113. The transmitter 114 performs a scrambling process and an encoding process on the basis of the signal S104 to generate a signal S114.

FIG. 2 illustrates a configuration example of the transmitter 111. Each of the transmitters 112 to 114 also have a similar configuration. The transmitter 111 includes an initial value register 14, a cyclic redundancy check (CRC) code generator 15, a frame generator 13, a scrambler 30, and an encoder 18.

The initial value register 14 is a register in which an initial value INIT is to be stored. The initial value INIT is a set value that indicates an initial state of the scrambler 30, as described later. Initial values INIT are set to different values in the transmitters 111 to 114, as described later. For example, the initial values INIT may be set to lane numbers (physical lane numbers) of the communication lanes corresponding to respective transmitters.

The CRC code generator 15 generates a CRC code Bcrc to be used to make a cyclic redundancy check, on the basis of the initial value INIT. Then, the CRC code generator 15 supplies the generated CRC code Bcrc to the frame generator 13 together with the initial value INIT.

The frame generator 13 generates a frame F on the basis of the signal S101 (the data INF), and the initial value INIT and the CRC code Bcrc that are both supplied from the CRC code generator 15.

FIG. 3 illustrates a configuration example of the frame F. The frame F contains a header H and the data INF. The header H contains synchronization information SYNC, the initial value INIT, and the CRC code Bcrc. The synchronization information SYNC, the initial value INIT, and the CRC code Bcrc are disposed in this order in the header H. The synchronization information SYNC is disposed at the forefront of the frame F and used to identify delimiters between individual frames F in sequential streams.

The frame generator 13 generates the frame F configured above, on the basis of the signal S101, the initial value INIT, and the CRC code Bcrc. Thereafter, the frame generator 13 supplies this frame F to the scrambler 30 by using a signal S13. The frame generator 13 also has a function of using a trigger signal Tr1 to inform the scrambler 30 of a timing related to a delimiter between the header H and the data INF, as described later.

The scrambler 30 performs the scrambling process on the signal S13 to generate a signal S30.

FIG. 4 illustrates a configuration example of the scrambler 30. In FIG. 4, the initial value register 14, the CRC code generator 15, and the frame generator 13 are also depicted in addition to the scrambler 30. The scrambler 30 includes a shift register unit 31, a setting register 33, an exclusive OR circuit 34, and a selector 35.

The shift register unit 31 is implemented using a so-called linear feedback shift register (LFSR). In this example, the shift register unit 31 includes four registers R0 to R3 and an exclusive OR circuit 32. An input terminal of the register R0 is supplied with a signal S31, and an output terminal of the register R0 is coupled to an input terminal of the register R1. The input terminal of the register R1 is coupled to the output terminal of the register R0, and an output terminal of the register R1 is coupled to an input terminal of the register R2. The input terminal of the register R2 is coupled to the output terminal of the register R1, and an output terminal of the register R2 is coupled to a second input terminal of the exclusive OR circuit 32. A first input terminal of the exclusive OR circuit 32 is supplied with the signal S31, the second input terminal of the exclusive OR circuit 32 is coupled to the output terminal of the register R2, and an output terminal of the exclusive OR circuit 32 is coupled to an input terminal of the register R3. The input terminal of the register R3 is coupled to the output terminal of the exclusive OR circuit 32, and the signal S31 is output from an output terminal of the register R3. The initial values of the registers R0 to R3 are set by the setting register 33.

With this configuration, the shift register unit 31 generates a random pattern in accordance with a generating polynomial expressed by $X^4+X^3+1$, and then outputs this random pattern as the signal S31. It is to be noted that a configuration of the shift register unit 31 is not limited to this configuration, and various configurations that make it possible to realize other generating polynomials are applicable.

The setting register 33 stores the initial value INIT supplied from the initial value register 14 and sets register values of the registers R0 to R3 to the initial value INIT at a timing corresponding to the trigger signal Tr1.

The exclusive OR circuit 34 determines an exclusive OR between the signal S13 supplied from the frame generator 13 and the signal S31 supplied from the shift register unit 31, to generate a signal S34.

In a case where the signal S13 indicates the header H, the selector 35 selects the signal S13. In a case where the signal S13 indicates the data INF, the selector 35 selects the signal S34. Then, the selector 35 outputs the selected signal as the signal S30.

FIG. 5 illustrates a frame F contained in the signal S30. This frame F contains the header H and data INFS on which the scrambling process has been performed. In this way, the scrambler 30 does not perform the scrambling process on the header H, but performs the scrambling process on the data INF.

The encoder 18 performs the encoding process on the signal S30 to generate the signal S111, as illustrated in FIG. 2. In this encoding process, for example, so-called 8B/10B conversion may be employed.

The output unit 121 generates a data signal on the basis of the signal S111 and then transmits this data signal to the receiving device 20 via the cable 901, as illustrated in FIG. 1. Likewise, the output unit 122 generates a data signal on the basis of the signal S112 and then transmits this data signal to the receiving device 20 via the cable 902. The output unit 123 generates a data signal on the basis of the signal S113 and then transmits this data signal to the receiving device 20 via the cable 903. The output unit 124 generates a data signal on the basis of the signal S114 and then transmits this data signal to the receiving device 20 via the cable 904. In the case where the data signals are interchanged through electrical signals in the communication system 1, the output units 121 to 124 may be implemented using driver circuits that transmit the electrical signals. Alternatively, in the case where the data signals are interchanged through optical signals in the communication system 1, the output units 121 to 124 may be implemented using laser diodes.

The receiving device 20 includes the connector 21, four input units 201 to 204, four receivers 211 to 214, and a processor 220.

The connector 21 is coupled to the connector 92 of the transmission cable 90.

The input unit 201 receives the data signal supplied from the transmitting device 10 via the cable 901 to generate a signal S201. Likewise, the input unit 202 receives the data signal supplied from the transmitting device 10 via the cable 902 to generate a signal S202. The input unit 203 receives the data signal supplied from the transmitting device 10 via the cable 903 to generate a signal S203. The input unit 204 receives the data signal supplied from the transmitting device 10 via the cable 904 to generate a signal S204. In the case where the data signals are interchanged through electrical signals in the communication system 1, the input units 201 to 204 may be implemented using receiver circuits that receive the electrical signals. Alternatively, in the case where the data signals are interchanged through optical signals in the communication system 1, the input units 201 to 204 may be implemented using photodiodes.

The receiver 211 performs a decoding process and a descrambling process on the basis of the signal S201 to generate a signal S211. Likewise, the receiver 212 performs a decoding process and a descrambling process on the basis of the signal S202 to generate a signal S212. The receiver 213 performs a decoding process and a descrambling process on the basis of the signal S203 to generate a signal S213. The receiver 214 performs a decoding process and a descrambling process on the basis of the signal S204 to generate a signal S214.

FIG. 6 illustrates a configuration example of the receiver 211. Each of the receivers 212 to 214 may also have a similar configuration. The receiver 211 includes a decoder 24, a frame synchronizer 25, a CRC check unit 26, and a descrambler 40.

The decoder 24 performs the decoding process on the signal S201 to generate a signal S24. This decoding process corresponds to the encoding process performed by each encoder 18 in the transmitting device 10.

The frame synchronizer 25 performs a synchronous process on the basis of the signal S24. More specifically, the frame synchronizer 25 detects the synchronization information SYNC from the signal S24, thereby recognizing a start timing of the frame F. Then, the frame synchronizer 25 separates the header H from the frame F and supplies the initial value INIT and the CRC code Bcrc contained in the header H to the CRC check unit 26. Thereafter, the frame synchronizer 25 uses a trigger signal Tr2 to inform the descrambler 40 of a timing related to a delimiter between header H and the data INFS on which the scrambling process has been performed, as described later. The frame synchronizer 25 outputs, as a signal S25, the data INFS on which the scrambling process has been performed and is contained in the frame F.

The CRC check unit 26 checks whether the initial value INIT contains an error, on the basis of the initial value INIT and the CRC code Bcrc. In a case where the initial value INIT contains no errors, the CRC check unit 26 supplies this initial value INIT to the descrambler 40. However, in a case where the initial value INIT contains an error, the CRC check unit 26 does not supply this initial value INIT to the descrambler 40.

The descrambler 40 performs the descrambling process on the signal S25 to generate the signal S211.

FIG. 7 illustrates a configuration example of the descrambler 40. In FIG. 7, the frame synchronizer 25 and the CRC check unit 26 are also depicted in addition to the descrambler 40. The descrambler 40 includes a shift register unit 41, a setting register 43, and an exclusive OR circuit 44.

The shift register unit 41 may have a configuration similar to the configuration of the shift register unit 31 (illustrated in FIG. 4) in the scrambler 30. The shift register unit 41 includes registers R10 to R13 and an exclusive OR circuit 42. With this configuration, similarly to the shift register unit 31, the shift register unit 41 generates a random pattern in accordance with the generating polynomial expressed by $X^4+X^3+1$, and then outputs this random pattern as a signal S41.

The setting register 43 stores the initial value INIT supplied from the CRC check unit 26 and sets register values of the registers R10 to R13 to the initial value INIT at a timing corresponding to the trigger signal Tr2. In a case where the initial value INIT is not supplied from the CRC check unit 26, the setting register 43 sets the register values of the registers R10 to R13 by using the last one of initial values INIT that have been ever supplied. More specifically, the setting register 33 sets the register values of the registers R10 to R13 by using the initial value INIT that has been determined by the CRC check unit 26 to contain no errors.

The exclusive OR circuit 44 determines an exclusive OR between the signal S25 supplied from the frame synchronizer 25 and the signal S41 supplied from the shift register unit 41, to generate a signal S211.

As illustrated in FIG. 1, the processor 220 receives the signals S211 to S214 (the data INF), and then performs a predetermined process on the basis of the received data INF.

Herein, the initial value INIT corresponds to a concrete example of an "initial value" in the disclosure. The CRC code Bcrc corresponds to a concrete example of a "check code" in the disclosure. The CRC check unit 26 corresponds to a concrete example of a "check unit" in the disclosure.

Operation and Workings

Next, a description will be given of an operation and workings of the communication system 1 in this embodiment.

(Outline of Overall Operation)

A description will be given of an outline of an overall operation of the communication system 1 with reference to FIGS. 1, 2, and 6. In the transmitting device 10, the processor 100 (illustrated in FIG. 1) performs a predetermined process to generate the data INF, and then outputs this data INF as the signals S101 to S104. In the transmitter 111, the frame generator 13 (illustrated in FIG. 2) generates the frame F on the basis of the signal S101 (the data INF), the initial value INIT, and the CRC code B, and then outputs this frame F as the signal S13. The scrambler 30 performs the scrambling process on the signal S13 to generate the signal S30. The encoder 18 performs the encoding process on the signal S30 to generate the signal S111. The output unit 121 (illustrated in FIG. 1) generates the data signal on the basis of the signal S111, and then transmits the data signal to the receiving device 20 via the cable 901. The transmitters 112 to 114 and the output units 122 to 124 operate in similar manners.

In the receiving device 20, the input unit 201 (illustrated in FIG. 1) receives the data signal supplied from the output unit 121 via the cable 901 to generate the signal S201. In the receiver 211, the decoder 24 (illustrated in FIG. 6) performs the decoding process on the signal S201 to generate the signal S24. The frame synchronizer 25 performs the synchronous process on the basis of the signal S24, and then outputs, as the signal S25, the data INFS on which the scrambling process has been performed. The descrambler 40 performs the descrambling process on the signal S25 to generate the signal S211. The input units 202 to 204 and the receivers 212 to 214 operate in similar manners. The processor 220 (illustrated in FIG. 1) receives the signals S211 to S214 (the data INF), and then performs a predetermined process on the basis of this received data INF.

(Detailed Operation)

In the communication system 1, the scrambler 30 in each of the transmitters 111 to 114 performs the scrambling process, and the descrambler 40 in each of the receivers 211 to 214 performs the descrambling process. Next, operations of each scrambler 30 and each descrambler 40 will be described in detail.

FIG. 8 illustrates an operational example of the transmitter 111. In FIG. 8, Part (A) illustrates the signal S13 input to the scrambler 30. Part (B) illustrates a register value of the shift register unit 31. Part (C) illustrates the signal S31 output from the shift register unit 31. Part (D) illustrates the signal S34 output from the exclusive OR circuit 34. Part (E) illustrates the signal S30 output from the scrambler 30. In this case, the register value of the shift register unit 31 (illustrated in Part (B) of FIG. 8) may be a value obtained in a case where the register R3 corresponds to an MSB and the register R0 corresponds to an LSB. The marks "X" in Parts (B) to (D) of FIG. 8 each indicate that a signal may be in any state.

The CRC code generator 15 generates the CRC code Bcrc to be used to make a cyclic redundancy check, on the basis of the initial value INIT. Then, the CRC code generator 15 supplies the generated CRC code Bcrc to the frame generator 13 together with the initial value INIT. In this example, the initial value INIT is "1".

The frame generator 13 generates the header H by using the synchronization information SYNC, the CRC code Bcrc, and the initial value INIT. Then, the frame generator 13 adds the header H to the data INF ("D0", "D1", "D2", "D3", "D4", and so on) to generate the frame F. The frame generator 13 outputs this frame F as the signal S13 (illustrated in Part (A) of FIG. 8). In addition, the frame generator 13 uses the trigger signal Tr1 to inform the scrambler 30 of the timing related to the delimiter between the header H and the data INF.

The setting register 33 in the scrambler 30 sets a register value of the shift register unit 31 to the initial value INIT on the basis of the trigger signal Tr1 and at the timing related to the delimiter between the header H and the data INF. In this case, the initial value INIT is "1" (as illustrated in Part (B) of FIG. 8). Following this, in this example, the register value of the shift register unit 31 changes like "1", "2", "4", "8", "9", and so on. In response to this, the signal S31 output from the shift register unit 31 changes like "0", "0", "0", "1", "1", and so on (as illustrated in Part (C) of FIG. 8).

Further, the exclusive OR circuit 34 determines an exclusive OR between the signal S31 (illustrated in Part (C) of FIG. 8) and the signal S13 (illustrated in Part (A) of FIG. 8) to generate the signal S34 (as illustrated in Part (D) of FIG. 8). The signal S34 contains the data INFS ("E0", "E1", "E2", "E3", "E4", and so on) on which the scrambling process has been performed. In the signal S34, the mark "E0" represents an exclusive OR between "D0" and "0". The mark "E1" represents an exclusive OR between "D1" and "0". The mark "E2" represents an exclusive OR between "D2" and "0". The mark "E3" represents an exclusive OR between "D3" and "1". The mark "E4" represents an exclusive OR between "D4" and "0".

In a case where the signal S13 indicates the header H, the selector 35 selects the signal S13 (illustrated in Part (A) of FIG. 8). In a case where the signal S13 indicates the data INFS, the selector 35 selects the signal S34 (illustrated in Part (D) of FIG. 8). As a result, the selector 35 generates the signal S30 (illustrated in Part (E) of FIG. 8) that contains the header H of the signal S13 that has not been processed and the data INFS ("E0", "E1", "E2", "E3", "E4", and so on) on which the scrambling process has been performed.

In this way, each scrambler 30 performs the scrambling process. The frame F on which the scrambling process has been performed in this manner is transmitted from the transmitting device 10 to the receiving device 20.

FIG. 9 illustrates an operational example of the receiver 211. In FIG. 9, Part (A) illustrates the signal S24 input to the frame synchronizer 25. Part (B) illustrates the signal S25 output from the frame synchronizer 25. Part (C) illustrates a register value of the shift register unit 41. Part (D) illustrates the signal S41 output from the shift register unit 41. Part (E) illustrates the signal S211 output from the descrambler 40.

In this example, the decoder 24 may use the signal S24 to supply the header H and the data INFS on which the scrambling process has been performed to the frame synchronizer 25 (as illustrated in Part (A) of FIG. 9).

The frame synchronizer 25 supplies the initial value INIT and the CRC code Bcrc contained in the header H to the CRC check unit 26. In addition, the frame synchronizer 25 uses the trigger signal Tr2 to inform the descrambler 40 of the timing related to the delimiter between the header H and the data INFS on which the scrambling process has been performed. Moreover, the frame synchronizer 25 outputs, as the signal S25 (illustrated in Part (B) of FIG. 9), the data INFS on which the scrambling process has been performed and is contained in the frame F.

The CRC check unit 26 checks whether the initial value INIT contains an error, on the basis of the initial value INIT and the CRC code Bcrc. Thereafter, in a case where the initial value INIT contains no errors, the CRC check unit 26 supplies this initial value INIT to the descrambler 40.

The setting register 43 in the descrambler 40 sets the register value of the shift register unit 41 to the initial value INIT on the basis of the trigger signal Tr2 and at the timing related to the delimiter between the header H and the data INFS on which the scrambling process has been performed (as illustrated in Part (C) of FIG. 9). In this example, the initial value INIT is "1". Following this, in the example, the register value of the shift register unit 41 changes like "1", "2", "4", "8", "9", and so on. In other words, the shift register unit 41 has substantially the same configuration as the shift register unit 31 in the scrambler 30; therefore, the register value of the shift register unit 41 (illustrated in Part (C) of FIG. 9) changes in a similar way to the register value of the shift register unit 31 (illustrated in Part (B) of FIG. 8). In response to this, the signal S41 output from the shift register unit 41 changes like "0", "0", "0", "1", "1", and so on (as illustrated in Part (D) of FIG. 9).

The exclusive OR circuit 44 determines an exclusive OR between the signal S41 (illustrated in Part (D) of FIG. 9) and the signal S25 (illustrated in Part (B) of FIG. 9) to generate the signal S211 (illustrated in Part (E) of FIG. 9). More specifically, for example, the exclusive OR circuit 44 determines an exclusive OR between "E0" and "0" to generate "D0", determines an exclusive OR between "E1" and "0" to generate "D1", determines an exclusive OR between "E2" and "0" to generate "D2", determines an exclusive OR between "E3" and "1" to generate "D3", and determines an exclusive OR between "E4" and "1" to generate "D4". In other words, the data INF that is the same as the data INF (illustrated in Part (A) of FIG. 8) venerated by the processor 100 in the transmitting device 10 emerges in the signal S211.

In this way, each descrambler 40 performs the descrambling process.

In the communication system 1, as described above, the scrambler 30 in each of the transmitters 111 to 114 performs the scrambling process, and the descrambler 40 in each of the receivers 211 to 214 performs the descrambling process. In this case, the scramblers 30 in the transmitters 111 to 114 perform the scrambling processes by using initial values INIT that are different from one another. As an example, a description will be given below of an operation of the scrambler 30 in the transmitter 112.

FIG. 10 illustrates an operational example of the transmitter 112. In FIG. 10, Part (A) illustrates the signal S13 input to the scrambler 30. Part (B) illustrates the register value of the shift register unit 31. Part (C) illustrates the signal S31 output from the shift register unit 31. Part (D) illustrates the signal S34 output from the exclusive OR circuit 34. Part (E) illustrates the signal S30 output from the scrambler 30.

The CRC code generator 15 generates the CRC code Bcrc to be used to make a cyclic redundancy check, on the basis of the initial value INIT. Then, the CRC code generator 15 supplies the generated CRC code Bcrc to the frame generator 13 together with the initial value INIT. In this example, the initial value INIT may be "2". In short, the transmitter 112 sets the initial value INIT to a value different from "1", to which the transmitter 111 sets the initial value INIT (as illustrated in FIG. 8).

The frame generator 13 generates the header H by using the synchronization information SYNC, the CRC code Bcrc, and the initial value INIT. Then, the frame generator 13 adds the header H to the data INF to generate the frame F. The frame generator 13 outputs this frame F as the signal S13 (illustrated in Part (A) of FIG. 10). In addition, the frame generator 13 uses the trigger signal Tr1 to inform the scrambler 30 of the timing related to the delimiter between the header H and the data INF.

The setting register 33 in the scrambler 30 sets the register value of the shift register unit 31 to the initial value INIT on the basis of the trigger signal Tr1 and at the timing related to the delimiter between the header H and the data INF. In this case, the initial value INIT is "2" (as illustrated in Part (B) of FIG. 10). Following this, in this example, the register value of the shift register unit 31 may change like "2", "4", "8", "9", "B", and so on. In response to this, the signal S31 output from the shift register unit 31 may change like "0", "0", "1", "1", "1", and so on (as illustrated in Part (C) of FIG. 10).

The remaining operation is similar to the operation of the transmitter 111 (refer to FIG. 8).

In the communication system 1, as described above, the scramblers 30 in the transmitters 111 to 114 perform the scrambling processes by using the initial values INIT that are different from one another. This makes it possible to reduce the risk of causing electro-magnetic interference. Specifically, first, there are some applications in which the processor 100 may supply the same data INF to transmitters 111 to 114. More specifically, as an example, in a case where an image signal is transmitted using four transmission cables 90, for example, if an image filled with a single color (such as a white color) is transmitted, the same data INF may be supplied to the transmitters 111 to 114. As another example, the same filler signal may be supplied to the transmitters 111 to 114 during a blanking period. In a case where the initial values INIT of the scramblers 30 in the transmitters 111 to 114 are equal to one another, if the same data INF is supplied to the transmitters 111 to 114 as described above, the transmitters 111 to 114 output the signals S111 to S114 having the same data pattern. In this case, electro-magnetic wave noises emitted from the transmitters 111 to 114 are in phase, which may cause electro-magnetic interference. In contrast, the communication system 1 sets the initial values INIT of the scramblers 30 in the transmitters 111 to 114 to different values. In this case, even if the same data INF is supplied to the transmitters 111 to 114, the data patterns of the signals S111 to S114 are less likely to coincide with one another. Consequently, the communication system 1 makes it possible to suppress electro-magnetic wave noises emitted from the transmitters 111 to 114, thus reducing the risk of causing electro-magnetic interference. Further, the communication system 1 sets the initial values INIT to the physical lane numbers. This ensures that the initial values INIT are set to different values, making it possible to reduce the risk of causing electro-magnetic interference.

Moreover, in the communication system 1, the transmitters 111 to 114 transmit the respective initial values INIT, and then the receivers 211 to 214 obtain the initial values INIT used by the scramblers 30 in the transmitters 111 to 114, respectively. This enables the receivers 211 to 214 to perform the descrambling processes corresponding to the scrambling processes performed by the transmitters 111 to 114, respectively. In particular, even in a case where the connector 91 of the transmission cable 90 is coupled to the connector 11 of the transmitting device 10 in a reversible manner and the connector 92 of the transmission cable 90 is also coupled to the connector 21 of the receiving device 20 in a reversible manner as will be described below, the receivers 211 to 214 make it possible to perform the descrambling processes appropriately.

FIG. 11 illustrates an example of other connecting states in which the transmission cable 90 is coupled to both the transmitting device 10 and the receiving device 20 in a reversible manner. This configuration achieves various connecting states, as illustrated in FIGS. 1 and 11. In such cases, the receivers 211 to 214 obtain the initial values INIT used by the scramblers 30 in the transmitters 111 to 114, respectively, thus making it possible to perform the descrambling processes appropriately in accordance with those connecting states. Moreover, the communication system 1 configured as above allows a user to couple the transmitting device 10 to the receiving device 20 without concern for orientation of a connector, thus making it possible to provide the user with great convenience.

Further, in the communication system 1, each of the transmitters 111 to 114 transmits the CRC code Bcrc in addition to the initial value INIT. Therefore, even in a case where an error occurs in one of the initial values INIT while the initial values INIT are being transmitted, a corresponding one of the receivers 211 to 214 successfully recognizes the occurrence of the error. More specifically, for example, in a case where the transmitters 111 to 114 do not transmit the CRC codes Bcrc, even if an error occurs in one of the initial values INIT while the initial values INIT are being transmitted in the communication system 1, the receivers 211 to 214 fails to recognize the occurrence of the error in the one of the initial values INIT. This tends to be more prominent, especially in a case where the initial values INIT are set to any given values other than the physical lane numbers. In this case, the descramblers 40 operate on the basis of the initial values INIT that contain an error. As a result, any of the descramblers 40 may fail to perform the descrambling process correctly. In the communication system 1, however, each of the transmitters 111 to 114 also transmits the CRC code Bcrc. Therefore, even if an error occurs in one of the initial values INIT while the initial values INIT are being transmitted, a corresponding one of the receivers 211 to 214 successfully recognizes the occurrence of the error. This enables the receivers 211 to 214 to avoid using the initial value INIT containing the error.

In the communication system 1, if one of the initial values INIT contains an error, a corresponding one of the CRC check unit 26 does not supply this initial value INIT to the descrambler 40. Then, if the initial value INIT is not supplied from the CRC check unit 26, the setting register 43 sets the register values of the registers R10 to R13 by using the last one of initial values INIT that have been ever supplied. In this way, the communication system 1 enables the receivers 211 to 214 to continuously perform the descrambling processes without interrupting the descrambling processes.

Effect

In this embodiment, as described above, the scramblers in the respective transmitters perform the scrambling process by using initial values that are different from one another, thereby making it possible to reduce the risk of causing electro-magnetic interference.

In this embodiment, the transmitters transmit the initial values, thereby enabling receivers to perform descrambling processes corresponding to the scrambling processes in the transmitters. Further, even if the transmitting device is coupled to the receiving device via the transmission cable in a reversible manner, each of the receivers makes it possible to perform the descrambling process appropriately in accordance with this connecting state.

In this embodiment, each transmitter transmits a CRC code in addition to the initial value. This enables each of the receivers to, even if an error occurs in the initial value while the initial value is being transmitted, recognize the occurrence of the error and avoid using this initial value containing the error.

In this embodiment, if one of the initial values contains an error, a corresponding one of the CRC check units does not supply this initial value to the descrambler. If the initial value is not supplied from the CRC check unit, the setting register sets the register value of the register by using the last one of initial values that have been ever supplied. This enables each of the receivers to continuously perform the descrambling process without interrupting the descrambling process.

Modification 1-1

In the foregoing embodiment, the transmitting device 10 transmits the CRC codes Bcrc. However, the configuration of the communication system 1 is non-limiting. As an alternative example, the transmitting device 10 may transmit error correcting codes Becc. Hereinafter, this modification will be described in detail.

FIG. 12 illustrates a configuration example of a transmitter 111A according to this modification. The transmitter 111A includes an error correction encoder 15A and a frame generator 13A. More specifically, the transmitter 111A is equivalent to the transmitter 111 (illustrated in FIG. 2) according to the foregoing embodiment in which the CRC code generator 15 is replaced by the error correction encoder 15A and the frame generator 13 is replaced by the frame generator 13A. The error correction encoder 15A generates an error correcting code Becc on the basis of the initial value INIT. As the error correcting code Becc, for example, a Reed-Solomon code may be used. Then, the error correction encoder 15A supplies the generated error correcting code Becc to the frame generator 13A together with the initial value INIT. The frame generator 13A generates the frame F on the basis of the signal S101 (the data INF), and the initial value INIT and the error correcting code Becc that are both supplied from the error correction encoder 15A.

FIG. 13 illustrates a configuration example of a frame F according to the modification. The frame F contains a header H and the data INF. The header H contains the synchronization information SYNC, the initial value INIT, and the error correcting code Becc.

FIG. 14 illustrates a configuration example of a receiver 211A according to this modification. The receiver 211A includes a frame synchronizer 25A and an error correction decoder 26A. The frame synchronizer 25A performs the synchronous process on the basis of the signal S24, similarly to the frame synchronizer 25 according to the foregoing embodiment. In this case, the frame synchronizer 25A separates the header H from the frame F and then supplies the initial value INIT and the error correcting code Becc contained in the header H to the error correction decoder 26A. Then, the error correction decoder 26A checks whether the initial value INIT contains an error, on the basis of the initial value INIT and the error correcting code Becc. If the initial value INIT contains an error, the error correction decoder 26A corrects the initial value INIT.

Herein, the error correcting code Becc corresponds to a concrete example of an "error correcting code" in the disclosure. The error correction decoder 26A corresponds to a concrete example of a "correction unit" in the disclosure.

This configuration makes it possible to, if an error occurs in one of the initial values INIT while the initial values INIT are being transmitted, correct the initial value INIT so as to become a correct value.

Modification 1-2

In the foregoing embodiment, the transmitting device 10 transmits the initial values INIT and the CRC codes Bcrc. However, the configuration of the communication system 1 is non-limiting. As an alternative example, the transmitting device 10 may transmit the initial values INIT but may not transmit the CRC codes Bcrc. In this case, the receiving device may preferably employ a majority rule, for example, to determine an initial value INIT on the basis of a plurality of initial values INIT obtained from a plurality of frames F. In addition, the initial values INIT may be set to the physical lane numbers. By setting the initial values INIT so as to have regularity as described above, the receiving device makes it possible to easily verify whether received initial values INIT are correct without using the CRC codes Bcrc.

2. Second Embodiment

Next, a communication system 2 according to a second embodiment will be described. In this embodiment, a transmitting device that transmits no CRC codes is used. It is to be noted that identical reference numerals are given to constituent elements substantially the same as those in the communication system 1, and their descriptions are omitted as appropriate.

As illustrated in FIG. 1, the communication system 2 includes a transmitting device 50 and a receiving device 60. The transmitting device 50 includes transmitters 511 to 514. The receiving device 60 includes receivers 611 to 614.

FIG. 15 illustrates a configuration example of the transmitter 511. Each of the transmitters 512 to 514 also has a similar configuration. The transmitter 511 includes the initial value register 14, a frame generator 53, the scrambler 30, and the encoder 18. In other words, this transmitter 511 is equivalent to the transmitter 111 (illustrated in FIG. 2) according to the first embodiment in which the frame generator 13 is replaced by the frame generator 53 and from which the CRC code generator 15 is removed.

The frame generator 53 generates a frame F on the basis of a signal S101 (data INF). In addition, the frame generator 53 also has a function of using the trigger signal Tr1 to inform the scrambler 30 of the timing related to the delimiter between synchronization information SYNC and the data INF, as described later.

FIG. 16 illustrates a configuration example of the frame F. The frame F contains the synchronization information SYNC and the data INF. In other words, this frame F differs from the frame F (illustrated in FIG. 3) according to the first embodiment in not containing the initial value INIT and the CRC code Bcrc.

FIG. 17 illustrates a connection between the scrambler 30 and both the initial value register 14 and the frame generator 53. Similarly to the first embodiment (illustrated in FIG. 4), the setting register 33 in the scrambler 30 stores the initial value INIT supplied from the initial value register 14 and sets the register values of the registers R0 to R3 to the initial value INIT at the timing related to the trigger signal Tr1.

FIG. 18 illustrates the frame F contained in the signal S30. This frame F contains the synchronization information SYNC and the data INFS on which the scrambling process has been performed. Thus, the scrambler 30 does not perform the scrambling process on the synchronization information SYNC, but performs the scrambling process on the data INF.

FIG. 19 is a configuration example of the receiver 611. Each of the receivers 612 to 614 may also have a similar configuration. The receiver 611 includes the decoder 24, a frame synchronizer 65, and the descrambler 40. In other words, this receiver 611 is equivalent to the receiver 211 (illustrated in FIG. 6) according to the first embodiment in which the frame synchronizer 25 is replaced by the frame synchronizer 65, from which the CRC check unit 26 is removed, and to which an initial value register 67 is added.

The frame synchronizer 65 performs a synchronous process on the basis of the signal S24. More specifically, the frame synchronizer 65 detects the synchronization information SYNC from the signal S24, recognizing a start timing of the frame F. Then, the frame synchronizer 65 uses the trigger signal Tr2 to inform the descrambler 40 of the timing related to the delimiter between the synchronization information SYNC and the data INFS on which the scrambling process has been performed, as described later. The frame synchronizer 65 outputs, as the signal S25, the data INFS on which the scrambling process has been performed and is contained in the frame F.

The initial value register 67 is a register in which the initial value INIT is stored. More specifically, the initial value INIT that is the same as the initial value INIT stored in the initial value register 14 of the transmitter 511 is stored in the initial value register 67.

FIG. 20 illustrates a connection between the descrambler 40 and both the frame synchronizer 65 and the initial value register 67. The setting register 43 in the descrambler 40 stores the initial value INIT supplied from the initial value register 67 and sets the register values of the registers R10 to R13 to the initial value INIT at the timing related to the trigger signal Tr2.

FIG. 21 illustrates an operational example of the transmitter 511. In FIG. 21, Part (A) illustrates the signal S13 input to the scrambler 30. Part (B) illustrates the register value of the shift register unit 31. Part (C) illustrates the signal S31 output from the shift register unit 31. Part (D) illustrates the signal S34 output from the exclusive OR circuit 34. Part (E) illustrates the signal S30 output from the scrambler 30.

The frame generator 53 adds the synchronization information SYNC to the data INF ("D0", "D1", "D2", "D3", "D4", and so on) to generate the frame F. Then, the frame generator 53 outputs this frame F as the signal S13 (illustrated in Part (A) of FIG. 21). In addition, the frame generator 53 uses the trigger signal Tr1 to inform the scrambler 30 of the timing related to the delimiter between the synchronization information SYNC and the data INF.

The setting register 33 in the scrambler 30 sets the register value of the shift register unit 31 to the initial value INIT on the basis of the trigger signal Tr1 and at the timing related to the delimiter between the synchronization information SYNC and the data INF. In this example, the initial value INIT is "1" (as illustrated in Part (B) of FIG. 21). Following this, in this example, the register value of the shift register unit 31 changes like "1", "2", "4", "8", "9", and so on. In response to this, the signal S31 output from the shift register unit 31 changes like "0", "0", "0", "1", "1", and so on (as illustrated in Part (C) of FIG. 21). Then, the exclusive OR circuit 34 determines an exclusive OR between the signal S31 (illustrated in Part (C) of FIG. 21) and the signal S13 (illustrated in Part (A) of FIG. 21) to generate the signal S34 (illustrated in Part (D) of FIG. 21).

In a case where the signal S13 indicates the synchronization information SYNC, the selector 35 selects the signal S13 (illustrated in Part (A) of FIG. 21). In a case where the signal S13 indicates the data INF, the selector 35 selects the signal S34 (illustrated in Part (D) of FIG. 21). As a result, the selector 35 generates the signal S30 (illustrated in Part (E) of FIG. 21) that contains the synchronization information SYNC of the signal S13 that has not been processed and the data INFS on which the scrambling process has been performed.

FIG. 22 illustrates an operational example of the receiver 611. In FIG. 22, Part (A) illustrates the signal S24 input to the frame synchronizer 65. Part (B) illustrates the signal S25 output from the frame synchronizer 65. Part (C) illustrates the register value of the shift register unit 41. Part (D) illustrates the signal S41 output from the shift register unit 41. Part (E) illustrates the signal S211 output from the descrambler 40.

In this example, the decoder 24 may use the signal S24 to supply the synchronization information SYNC and the data INFS on which the scrambling process has been performed to the frame synchronizer 65 (as illustrated in Part (A) of FIG. 22).

The frame synchronizer 65 uses the trigger signal Tr2 to inform the descrambler 40 of the timing related to the delimiter between the synchronization information SYNC and the data INFS on which the scrambling process has been performed. Moreover, the frame synchronizer 65 outputs, as the signal S25 (illustrated in Part (B) of FIG. 22), the data INFS on which the scrambling process has been performed and is contained in the frame F.

The setting register 43 in the descrambler 40 sets the register value of the shift register unit 41 to the initial value INIT on the basis of the trigger signal Tr2 and at the timing related to the delimiter between the synchronization information SYNC and the data INFS on which the scrambling process has been performed (as illustrated in Part (C) of FIG. 22). In this example, the initial value INIT is "1". Following this, in the example, the register value of the shift register unit 41 changes like "1", "2", "4", "8", "9", and so on. In response to this, the signal S41 output from the shift register unit 41 changes like "0", "0", "0", "1", "1", and so on (as illustrated in Part (D) of FIG. 22). Then, the exclusive OR circuit 44 determines an exclusive OR between the signal S41 (illustrated in Part (D) of FIG. 22) and the signal S25 (illustrated in Part (B) of FIG. 22) to generate the signal S211 (illustrated in Part (E) of FIG. 22).

In the communication system 2, as described above, the scrambler 30 in each of the transmitters 511 to 514 performs the scrambling process on the basis of the initial value INIT stored in the initial value register 14. The descrambler 40 in each of the receivers 611 to 614 performs the descrambling process on the basis of the initial value INIT stored in the initial value register 67. In this case, the scramblers 30 in the transmitters 511 to 514 perform the scrambling processes by using the initial values INIT that are different from one another, as in the foregoing first embodiment.

In the communication system 2, as described above, the transmitter 511 is provided with the initial value register 14, and the receiver 611 is provided with the initial value register 67. This enables the same initial value INIT to be stored in the initial value registers 14 and 67. Consequently, the communication system 2 does not have to transmit the initial values INIT, thus making it possible to achieve a simple configuration.

As described above, this embodiment, in which the transmitter and the receiver are each provided with the initial value register, makes it possible to achieve a simple configuration.

Although the description has been given by referring to some embodiments and modifications, the technology is not limited thereto, and may be modified in a variety of ways.

For example, the four cables 901 to 904 are used in each of the foregoing embodiments. However, the number of cables is not limited to four. Alternatively, three or less cables or five or more cables may be used.

Moreover, for example, the shift register unit 31 in each scrambler 30 generates a random pattern in accordance with the generating polynomial expressed by $X^4+X^3+1$. However, the configuration of each scrambler is non-limiting. FIG. 23 illustrates a key portion of a scrambler 30B according to this modification. The scrambler 30B includes a shift register unit 31, a setting register 33B, and exclusive OR circuits 81 to 88. In this example, a scrambler will be described, but it is to be noted that a descrambler may also have a similar configuration.

A shift register unit 31B includes sixteen registers R0 to R15 and exclusive OR circuits 71 to 73. An input terminal of the register R0 is supplied with a signal S71, and an output terminal of the register R0 is coupled to an input terminal of the register R1. The input terminal of the register R1 is coupled to the output terminal of the register R0, and an output terminal of the register R1 is coupled to an input terminal of the register R2. The input terminal of the register R2 is coupled to the output terminal of the register R1, and an output terminal of the register R2 is coupled to a second input terminal of the exclusive OR circuit 71. A first input terminal of the exclusive OR circuit 71 is supplied with the signal S71, the second input terminal of the exclusive OR circuit 71 is coupled to the output terminal of the register R2, and an output terminal of the exclusive OR circuit 71 is coupled to an input terminal of the register R3. The input terminal of the register R3 is coupled to the output terminal of the exclusive OR circuit 71, and an output terminal of the register R3 is coupled to a second input terminal of the exclusive OR circuit 72. A first input terminal of the exclusive OR circuit 72 is supplied with the signal S71, the second input terminal of the exclusive OR circuit 72 is coupled to the output terminal of the register R3, and an output terminal of the exclusive OR circuit 72 is coupled to an input terminal of the register R4. The input terminal of the register R4 is coupled to the output terminal of the exclusive OR circuit 72, and an output terminal of the register R4 is coupled to a second input terminal of the exclusive OR circuit 73. A first input terminal of the exclusive OR circuit 73 is supplied with the signal S71, the second input terminal of the exclusive OR circuit 73 is coupled to the output terminal of the register R4, and an output terminal of the exclusive OR circuit 73 is coupled to an input terminal of the register R5. The registers R5 to R15 constitute a shift register. The input terminal of the register R5 is coupled to the output terminal of the exclusive OR circuit 73, and an output terminal of the register R5 is coupled to an input terminal of the register R6. Each of the registers R6 to R14 has a similar connection. An input terminal of the register R15 is coupled to an output terminal of the register R14, and the signal S71 is output from an output terminal of the register R15. Initial values of these registers R0 to R15 are set by the setting register 33B. This shift register unit 31B generates a random pattern in accordance with a generating polynomial expressed by $X^{16}+X^5+X^4+X^3+1$.

The exclusive OR circuits 81 to 88 sequentially output signals in this order in a circulating manner, to generate a signal S34. The exclusive OR circuit 81 determines an exclusive OR between each of pieces of data D0, D8, D16, and so on contained in the signal S13 and a signal output from the register R15. The exclusive OR circuit 82 determines an exclusive OR between each of pieces of data D1, D9, D17, and so on contained in the signal S13 and a signal output from the register R14. The exclusive OR circuit 83 determines an exclusive OR between each of pieces of data D2, D10, D18, and so on contained in the signal S13 and a signal output from the register R13. The exclusive OR circuit 84 determines an exclusive OR between each of pieces of data D3, D11, D19, and so on contained in the signal S13 and a signal output from the register R12. The exclusive OR circuit 85 determines an exclusive OR between each of pieces of data D4, D12, D20, and so on contained in the signal S13 and a signal output from the register R11. The exclusive OR circuit 86 determines an exclusive OR between each of pieces of data D5, D13, D21, and so on contained in the signal S13 and a signal output from the register R10. The exclusive OR circuit 87 determines an exclusive OR between each of pieces of data D6, D14, D22, and so on contained in the signal S13 and a signal output from the register R9. The exclusive OR circuit 88 determines an exclusive OR between each of pieces of data D7, D15, D23, and so on contained in the signal S13 and a signal output from the register R8. With this configuration, first, the exclusive OR circuits 81 to 88 sequentially determine the exclusive ORs on the basis of the pieces of data D0 to D7. Then, the shift register unit 31B shifts the data eight times. The exclusive OR circuits 81 to 88 sequentially determine the exclusive ORs on the basis of the pieces of data D8 to D15. Thereafter, the scrambler 30B repeats these operations. In this way, the scrambler 30B performs the scrambling process by using the signals output from the registers R8 to R15.

It is to be noted that the effects described in the present specification are illustrative and non-limiting. The technology may have effects other than those described in the present specification.

The technology may have the following configurations.

(1) A transmitting device including a plurality of transmitters each of which includes a scrambler that performs a scrambling process on transmission data by using random data generated on a basis of an initial value and that transmits the transmission data on which the scrambling process has been performed, an initial value of a first scrambler in a first transmitter being different from an initial value of a second scrambler in a second transmitter, the first transmitter and the second transmitter belonging to the plurality of transmitters.

(2) The transmitting device according to (1), in which initial values of the scramblers in the transmitters are different from one another.

(3) The transmitting device according to (1) or (2), in which the first transmitter further transmits the initial value of the first scrambler.

(4) The transmitting device according to (3), in which the first transmitter further includes a frame generator that generates a frame containing the initial value of the first scrambler and the transmission data, and the first scrambler performs the scrambling process on the transmission data contained in the frame.

(5) The transmitting device according to (4), in which the first scrambler doses not perform the scrambling process on the initial value of the first scrambler contained in the frame.

(6) The transmitting device according to (3), in which the first transmitter further includes a frame generator that generates a frame containing a header and the transmission data, the header containing the initial value of the first scrambler, and the first scrambler performs the scrambling process on a portion other than the header.

(7) The transmitting device according to any one of (3) to (6), in which the first transmitter further transmits a check code to be used to check whether the initial value of the first scrambler contains an error.

(8) The transmitting device according to any one of (3) to (6), in which the first transmitter further transmits an error correcting code for the initial value of the first scrambler.

(9) The transmitting device according to any one of (1) to (8), in which
an initial value of the scrambler in each of the transmitters is a physical lane number of a communication lane corresponding to the relevant transmitter.

(10) A receiving device including a plurality of receivers each of which has a descrambler that performs a descrambling process on reception data by using random data generated on a basis of a first initial value,
a first initial value of a first descrambler in a first receiver being different from a first initial value of a second descrambler in a second receiver, the first receiver and the second receiver belonging to the plurality of receivers.

(11) The receiving device according to (10), in which
first initial values of the descramblers in the receivers are different from one another.

(12) The receiving device according to (10) or (11), in which
the first initial value of the first descrambler is variable.

(13) The receiving device according to any one of (10) to (12), in which
the first receiver further receives a second initial value, and
the first descrambler sets the first initial value on a basis of the second initial value.

(14) The receiving device according to (13), in which
the first receiver further receives a check code to be used to check whether the second initial value contains an error, and
the first descrambler sets the first initial value on a basis of the second initial value and the check code.

(15) The receiving device according to (14), in which
the first receiver further includes a check unit that checks whether the second initial value contains an error on a basis of the second initial value and the check code, and
in a case where the second initial value contains no errors, the first descrambler performs the descrambling process by using the second initial value as the first initial value.

(16) The receiving device according to (15), in which
in a case where the second initial value contains an error, the first descrambler performs the descrambling process by using, as the first initial value, the second initial value that the first receiver has received before.

(17) The receiving device according to (13), in which
the first receiver further receives an error correcting code for the second initial value, and
the first descrambler sets the first initial value on a basis of the second initial value and the error correcting code.

(18) The receiving device according to (17), in which
the first receiver further includes a correction unit that performs an error correction process on the second initial value on a basis of the second initial value and the error correcting code, and
the first descrambler performs the descrambling process by using, as the first initial value, the second initial value on which the error correction process has been performed.

(19) The receiving device according to (10) or (11), in which
the first initial value of the first descrambler is a fixed value.

(20) A communication system including:
a transmitting device including a plurality of transmitters each of which includes a scrambler that performs a scrambling process on transmission data by using random data generated on a basis of an initial value and that transmits the transmission data on which the scrambling process has been performed; and
a receiving device including a plurality of receivers corresponding to the plurality of transmitters,
an initial value of a first scrambler in a first transmitter being different from an initial value of a second scrambler in a second transmitter, the first transmitter and the second transmitter belonging to the plurality of transmitters.

This application is based upon and claims the benefit of priority of the Japanese Patent Application No. 2015-69107 filed with the Japan Patent Office on Mar. 30, 2015, the entire contents of which are incorporated herein by reference.

It should be understood that those skilled in the art can contemplate various modifications, combinations, sub-combinations, and variations on the basis of design requirements and other factors insofar as they are within the scope of the appended claims or the equivalents thereof.

The invention claimed is:
1. A transmitting device comprising:
a plurality of transmitters, each of the plurality of transmitters includes a scrambler configured to scramble transmission data by using random data that is generated on a basis of an initial value, and the each of the plurality of transmitters is configured to transmit the transmission data that is scrambled,
wherein the plurality of transmitters includes
a first transmitter including a first scrambler, and
a second transmitter including a second scrambler that is different than the first scrambler,
wherein a first initial value of the first scrambler is different from a second initial value of the second scrambler.

2. The transmitting device according to claim 1, wherein respective initial values of respective scramblers in the plurality of transmitters are different from one another.

3. The transmitting device according to claim 1, wherein the first transmitter is further configured to transmit the first initial value.

4. The transmitting device according to claim 3, wherein the first transmitter further includes a frame generator configured to generate a frame containing the first initial value and the transmission data, and
the first scrambler is further configured to scramble the transmission data contained in the frame that is generated.

5. The transmitting device according to claim 4, wherein the first scrambler is further configured to not scramble the first initial value contained in the frame that is generated.

6. The transmitting device according to claim 3, wherein the first transmitter further includes a frame generator configured to generate a frame containing a header and the transmission data, the header containing the first initial value, and
the first scrambler is further configured to scramble a portion of the frame other than the header.

7. The transmitting device according to claim 3, wherein the first transmitter is further configured to transmit a check code that indicates whether the first initial value contains an error.

8. The transmitting device according to claim 3, wherein the first transmitter is further configured to transmit an error correcting code for the first initial value.

9. The transmitting device according to claim 1, wherein the first initial value of the first scrambler is a physical lane number of a communication lane corresponding to the first transmitter.

10. A receiving device comprising:
a plurality of receivers, each of the plurality of receivers including a descrambler configured to descramble reception data by using random data that is generated on a basis of an initial value,
wherein the plurality of receivers includes
a first receiver including a first descrambler, and
a second receiver including a second descrambler that is different than the first descrambler,
wherein a first initial value of the first descrambler is different from a second initial value of the second descrambler.

11. The receiving device according to claim 10, wherein first respective initial values of respective descramblers in the plurality of receivers are different from one another.

12. The receiving device according to claim 10, wherein the first initial value is variable.

13. The receiving device according to claim 10, wherein the first receiver is further configured to receive a third initial value, and
the first descrambler is further configured to set the first initial value on a basis of the third initial value.

14. The receiving device according to claim 13, wherein the first receiver is further configured to receive a check code that indicates whether the third initial value contains an error, and
the first descrambler is further configured to set the first initial value on a basis of the third initial value and the check code.

15. The receiving device according to claim 14, wherein the first receiver further includes a check unit that is configured to check whether the third initial value contains an error on a basis of the third initial value and the check code, and
in a case where the third initial value contains no errors, the first descrambler is further configured to perform a descrambling process on the reception data by using the third initial value as the first initial value.

16. The receiving device according to claim 15, wherein in a case where the third initial value contains an error, the first descrambler is further configured to perform the descrambling process on the reception data by using, as the first initial value, a previous initial value that the first receiver has received before the third initial value.

17. The receiving device according to claim 13, wherein the first receiver is further configured to receive an error correcting code for the third initial value, and
the first descrambler is further configured to set the first initial value on a basis of the third initial value and the error correcting code.

18. The receiving device according to claim 17, wherein the first receiver further includes a correction unit that performs an error correction process on the third initial value on a basis of the third initial value and the error correcting code, and
the first descrambler is further configured to perform a descrambling process on the reception data by using, as the first initial value, the third initial value on which the error correction process has been performed.

19. The receiving device according to claim 10, wherein the first initial value is a fixed value.

20. A communication system comprising:
a transmitting device including
a plurality of transmitters, each of the plurality of transmitters includes a scrambler configured to scramble transmission data by using random data that is generated on a basis of an initial value, and the each of the plurality of transmitters is configured to transmit the transmission data that is scrambled,
wherein the plurality of transmitters includes
a first transmitter including a first scrambler, and
a second transmitter including a second scrambler that is different than the first scrambler,
wherein a first initial value of the first scrambler is different from a second initial value of the second scrambler; and
a receiving device including a plurality of receivers corresponding to the plurality of transmitters.

* * * * *